United States Patent
Green

(10) Patent No.: US 9,421,861 B2
(45) Date of Patent: *Aug. 23, 2016

(54) MODIFICATION OF AN INDUSTRIAL VEHICLE TO INCLUDE A CONTAINMENT AREA AND MOUNTING ASSEMBLY FOR AN ALTERNATE FUEL

(71) Applicant: Gaseous Fuel Systems, Corp., Weston, FL (US)

(72) Inventor: Jason Green, Davie, FL (US)

(73) Assignee: Gaseous Fuel Systems, Corp., Weston, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,263

(22) Filed: Nov. 11, 2014

(65) Prior Publication Data

US 2015/0129338 A1     May 14, 2015

Related U.S. Application Data

(63) Continuation-in-part of application No. 13/478,885, filed on May 23, 2012, now Pat. No. 8,882,071, which is a continuation-in-part of application No. 13/234,995, filed on Sep. 16, 2011, now Pat. No. 9,248,736.

(51) Int. Cl.
    *B60K 15/063*       (2006.01)
    *B60K 15/067*       (2006.01)
    (Continued)

(52) U.S. Cl.
    CPC ........... *B60K 15/067* (2013.01); *B60K 15/063* (2013.01); *B60K 15/07* (2013.01);
    (Continued)

(58) Field of Classification Search
    CPC .. B60K 15/063; B60K 15/067; B60K 15/07; B60K 2015/0637; B66F 9/07; F02M 37/00; B60P 1/00

USPC ................. 248/133, 220.21, 346.01, 346.03, 248/346.06; 280/830, 834; 220/562, 563; 123/575; 180/69.5, 314
See application file for complete search history.

(56) References Cited

U.S. PATENT DOCUMENTS

| 3,866,781 A | 2/1975 | Stedman et al. |
| 4,006,852 A | 2/1977 | Pilsner et al. |

(Continued)

FOREIGN PATENT DOCUMENTS

| CA | 2741263 | 10/2014 |
| WO | WO 02/101214 | 12/2002 |

(Continued)

OTHER PUBLICATIONS

GFS Corp., First LNG Mining Truck in U.S. [online press release]. Oct. 21, 2010. Retrieved from the internet on Oct. 25, 2012: http://www.d2ginc.com/PDF/First%2OLNG%20Mining%20 Truck%20In%20US%20Press%20Kit%20Oct%2021.pdf.

(Continued)

*Primary Examiner* — Eret McNichols
(74) *Attorney, Agent, or Firm* — Malloy & Malloy, P.L.

(57) ABSTRACT

A system and attendant structural components for incorporating an alternate fuel supply, such as of the type used in combination with a conventional distillate fuel, to power a heavy duty industrial vehicle, such as a mine haul dump truck. The system and attendant structure includes a mounting assembly structured for containment and support of the alternate fuel and a containment area disposed on the vehicle and structured and dimensioned to retain the mounting assembly therein. The containment area and the mounting assembly are disposed in laterally adjacent, exposed relation to an operator area of the mine haul truck, wherein the mounting assembly and the containment area are cooperatively disposed and structured to facilitate storage of the alternate fuel and operative communication and distribution thereof with the powering engine of the mine haul vehicle.

11 Claims, 16 Drawing Sheets

(51) Int. Cl.
  *B66F 9/07*  (2006.01)
  *F02M 37/00*  (2006.01)
  *B60P 1/00*  (2006.01)
  *B60K 15/07*  (2006.01)

(52) U.S. Cl.
  CPC .......... *B60P 1/00* (2013.01); *B66F 9/07* (2013.01); *F02M 37/00* (2013.01); *B60K 2015/0637* (2013.01); *B60Y 2200/142* (2013.01)

(56) References Cited

U.S. PATENT DOCUMENTS

| | | | |
|---|---|---|---|
| 4,078,629 A | 3/1978 | Kutay et al. |
| 4,234,922 A | 11/1980 | Wilde et al. |
| 4,288,086 A | 9/1981 | Oban et al. |
| 4,335,697 A | 6/1982 | McLean |
| 4,415,051 A | 11/1983 | Taylor |
| 4,442,665 A | 4/1984 | Fick et al. |
| 4,489,699 A | 12/1984 | Poehlman |
| 4,499,885 A | 2/1985 | Weissenbach et al. |
| 4,522,159 A | 6/1985 | Engel et al. |
| 4,527,516 A | 7/1985 | Foster |
| 4,535,728 A | 8/1985 | Batchelor |
| 4,597,364 A | 7/1986 | Young |
| 4,603,674 A | 8/1986 | Tanaka |
| 4,606,322 A | 8/1986 | Reid et al. |
| 4,617,904 A | 10/1986 | Pagdin |
| 4,641,625 A | 2/1987 | Smith |
| 4,708,094 A | 11/1987 | Helmich et al. |
| 4,770,428 A | 9/1988 | Sugiyama |
| 4,799,565 A | 1/1989 | Handa et al. |
| 4,817,568 A | 4/1989 | Bedford |
| 4,861,096 A | 8/1989 | Hastings |
| 4,955,326 A | 9/1990 | Helmich |
| 5,033,567 A | 7/1991 | Washburn et al. |
| 5,050,550 A | 9/1991 | Gao |
| 5,054,799 A | 10/1991 | Fingerle |
| 5,081,969 A | 1/1992 | Long, III |
| 5,092,305 A | 3/1992 | King |
| 5,156,230 A | 10/1992 | Washburn |
| 5,215,157 A | 6/1993 | Teich |
| 5,224,457 A | 7/1993 | Arsenault et al. |
| 5,355,854 A | 10/1994 | Aubee |
| 5,370,097 A | 12/1994 | Davis |
| 5,375,582 A | 12/1994 | Wimer |
| 5,379,740 A | 1/1995 | Moore et al. |
| 5,404,711 A | 4/1995 | Rajput |
| 5,518,272 A | 5/1996 | Fukagawa et al. |
| 5,526,786 A | 6/1996 | Beck et al. |
| 5,546,908 A | 8/1996 | Stokes |
| 5,566,653 A | 10/1996 | Feuling |
| 5,566,712 A | 10/1996 | White et al. |
| 5,593,167 A | 1/1997 | Barnhardt et al. |
| 5,598,825 A | 2/1997 | Neumann |
| 5,609,037 A | 3/1997 | Fischler |
| D384,341 S | 9/1997 | Hoffman et al. |
| 5,701,928 A | 12/1997 | Aoki |
| 5,735,253 A | 4/1998 | Perotto et al. |
| 5,755,210 A | 5/1998 | Sato et al. |
| 5,794,979 A | 8/1998 | Kasuga et al. |
| 5,806,490 A | 9/1998 | Nogi et al. |
| 5,810,309 A | 9/1998 | Augustine et al. |
| 5,845,940 A | 12/1998 | Colburn |
| 5,937,800 A | 8/1999 | Brown |
| 5,996,207 A | 12/1999 | Brown et al. |
| 6,003,478 A | 12/1999 | Huber |
| 6,041,762 A | 3/2000 | Sirosh et al. |
| 6,101,986 A | 8/2000 | Brown |
| 6,151,547 A | 11/2000 | Kumar et al. |
| 6,168,229 B1 | 1/2001 | Kooi |
| 6,250,260 B1 | 6/2001 | Green |
| 6,250,723 B1 | 6/2001 | Barberis et al. |
| 6,289,881 B1 | 9/2001 | Klopp |
| D452,693 S | 1/2002 | Mitchell |
| 6,513,485 B2 | 2/2003 | Ogawa et al. |
| 6,543,395 B2 | 4/2003 | Green |
| 6,550,811 B1 | 4/2003 | Bennett et al. |
| 6,676,163 B2 | 1/2004 | Joitescu et al. |
| 6,718,952 B2 | 4/2004 | Finch |
| 6,751,835 B2 | 6/2004 | Fenton |
| 6,766,231 B2 | 7/2004 | Nakagawa et al. |
| D496,940 S | 10/2004 | Fetterman |
| 6,863,034 B2 | 3/2005 | Kern et al. |
| 6,875,258 B2 | 4/2005 | Kuperus |
| 6,938,928 B2 | 9/2005 | Pfohl et al. |
| 7,019,626 B1 | 3/2006 | Funk |
| D525,550 S | 7/2006 | Egidio |
| D549,721 S | 8/2007 | Ito et al. |
| 7,270,209 B2 | 9/2007 | Suess |
| D552,121 S | 10/2007 | Carl et al. |
| D555,164 S | 11/2007 | Sergio |
| 7,299,122 B2 | 11/2007 | Perkins |
| 7,334,818 B2 | 2/2008 | Mascarenhas et al. |
| 7,341,164 B2 | 3/2008 | Barquist |
| 7,410,152 B2 | 8/2008 | Yates |
| 7,441,189 B2 | 10/2008 | Michaels |
| 7,444,986 B2 | 11/2008 | Shute |
| 7,607,630 B2 | 10/2009 | Jung et al. |
| 7,775,311 B1 | 8/2010 | Hardy et al. |
| 7,874,451 B2 | 1/2011 | Bel |
| 7,976,067 B2 | 7/2011 | Naganuma et al. |
| 7,979,522 B2 | 7/2011 | Lunsford |
| 8,005,603 B2 | 8/2011 | Fisher et al. |
| 8,125,346 B2 | 2/2012 | Ballard et al. |
| 8,282,132 B2 | 10/2012 | Griesbaum |
| D681,670 S | 5/2013 | Fletcher et al. |
| D686,244 S | 7/2013 | Moriya et al. |
| 8,498,799 B2 | 7/2013 | Matthews, Jr. et al. |
| 8,534,403 B2 | 9/2013 | Pursifull |
| 8,550,274 B2 | 10/2013 | Gerding |
| 8,556,107 B2 | 10/2013 | Mcrobbie et al. |
| 8,820,289 B2 | 9/2014 | Green |
| 8,881,933 B2 | 11/2014 | Green |
| 8,882,071 B2 | 11/2014 | Green |
| 9,031,763 B2 | 5/2015 | Green |
| D733,176 S | 6/2015 | Lin |
| 2001/0037549 A1 | 11/2001 | Fenton |
| 2002/0017088 A1 | 2/2002 | Dillon |
| 2002/0029770 A1 | 3/2002 | Heffel et al. |
| 2002/0030397 A1 | 3/2002 | Tamura et al. |
| 2002/0078918 A1 | 6/2002 | Ancimer et al. |
| 2003/0178422 A1 | 9/2003 | Kosuge et al. |
| 2003/0187565 A1 | 10/2003 | Wong |
| 2004/0011050 A1 | 1/2004 | Inoue |
| 2004/0140412 A1 | 7/2004 | Hendzel et al. |
| 2004/0148086 A1 | 7/2004 | Tafazoli et al. |
| 2005/0121005 A1 | 6/2005 | Edwards |
| 2005/0230579 A1 | 10/2005 | Mascarenhas et al. |
| 2006/0033322 A1 | 2/2006 | Suess |
| 2006/0161315 A1 | 7/2006 | Lewis |
| 2007/0277530 A1 | 12/2007 | Dinu et al. |
| 2008/0023957 A1 | 1/2008 | Diehl |
| 2008/0042028 A1* | 2/2008 | Ross et al. .......... B60K 15/07 248/230.1 |
| 2008/0163627 A1 | 7/2008 | Elkady et al. |
| 2009/0000842 A1 | 1/2009 | Hwang et al. |
| 2009/0152043 A1 | 6/2009 | Lee |
| 2009/0320786 A1 | 12/2009 | Fisher |
| 2010/0045017 A1 | 2/2010 | Rea |
| 2010/0051567 A1* | 3/2010 | Ross, Jr. ............ B60K 15/07 211/85.18 |
| 2010/0078244 A1 | 4/2010 | Pursifull |
| 2010/0127002 A1 | 5/2010 | Bel |
| 2010/0263382 A1 | 10/2010 | Mancini et al. |
| 2011/0087988 A1 | 4/2011 | Ray et al. |
| 2011/0202256 A1 | 8/2011 | Sauve et al. |
| 2011/0209074 A1 | 8/2011 | Gill et al. |
| 2012/0001743 A1 | 1/2012 | Cotten et al. |
| 2012/0060800 A1 | 3/2012 | Green |
| 2012/0067660 A1 | 3/2012 | Kashu et al. |
| 2012/0112533 A1 | 5/2012 | Yarmak et al. |
| 2012/0253641 A1 | 10/2012 | Warner et al. |
| 2012/0310509 A1 | 12/2012 | Pardo et al. |
| 2012/0325355 A1 | 12/2012 | Docheff |

(56) References Cited

U.S. PATENT DOCUMENTS

| | | |
|---|---|---|
| 2013/0068905 A1 | 3/2013 | Green |
| 2013/0069357 A1 | 3/2013 | Green |
| 2013/0074816 A1 | 3/2013 | Green |
| 2013/0092694 A1 | 4/2013 | Green |
| 2013/0112768 A1 | 5/2013 | Hagenbuch |
| 2013/0245864 A1 | 9/2013 | Frazier et al. |
| 2013/0284747 A1 | 10/2013 | Rund |
| 2013/0284748 A1 | 10/2013 | Sloan et al. |
| 2014/0053800 A1 | 2/2014 | Steffen et al. |
| 2014/0053816 A1 | 2/2014 | Czapka et al. |
| 2014/0060946 A1* | 3/2014 | Willi ............... B60K 15/07 180/69.4 |
| 2014/0196687 A1 | 7/2014 | Coldren et al. |
| 2015/0000643 A1 | 1/2015 | Green |
| 2015/0020770 A1 | 1/2015 | Green |
| 2015/0025774 A1 | 1/2015 | Green |
| 2015/0142491 A1 | 5/2015 | Webb |

FOREIGN PATENT DOCUMENTS

| | | |
|---|---|---|
| WO | WO 2008/037175 | 4/2008 |
| WO | WO 2012/036768 | 3/2012 |
| WO | WO 2013/039708 | 3/2013 |
| WO | WO 2013/048812 | 4/2013 |
| WO | WO 2013/058988 | 4/2013 |
| WO | WO 2014/197594 | 12/2014 |
| WO | WO 2016/057239 | 4/2016 |
| WO | WO 2016/065026 | 4/2016 |
| WO | WO 2016/065109 | 4/2016 |

OTHER PUBLICATIONS

Caterpillar 785C Mining Truck Spec Sheet, 2010.

* cited by examiner

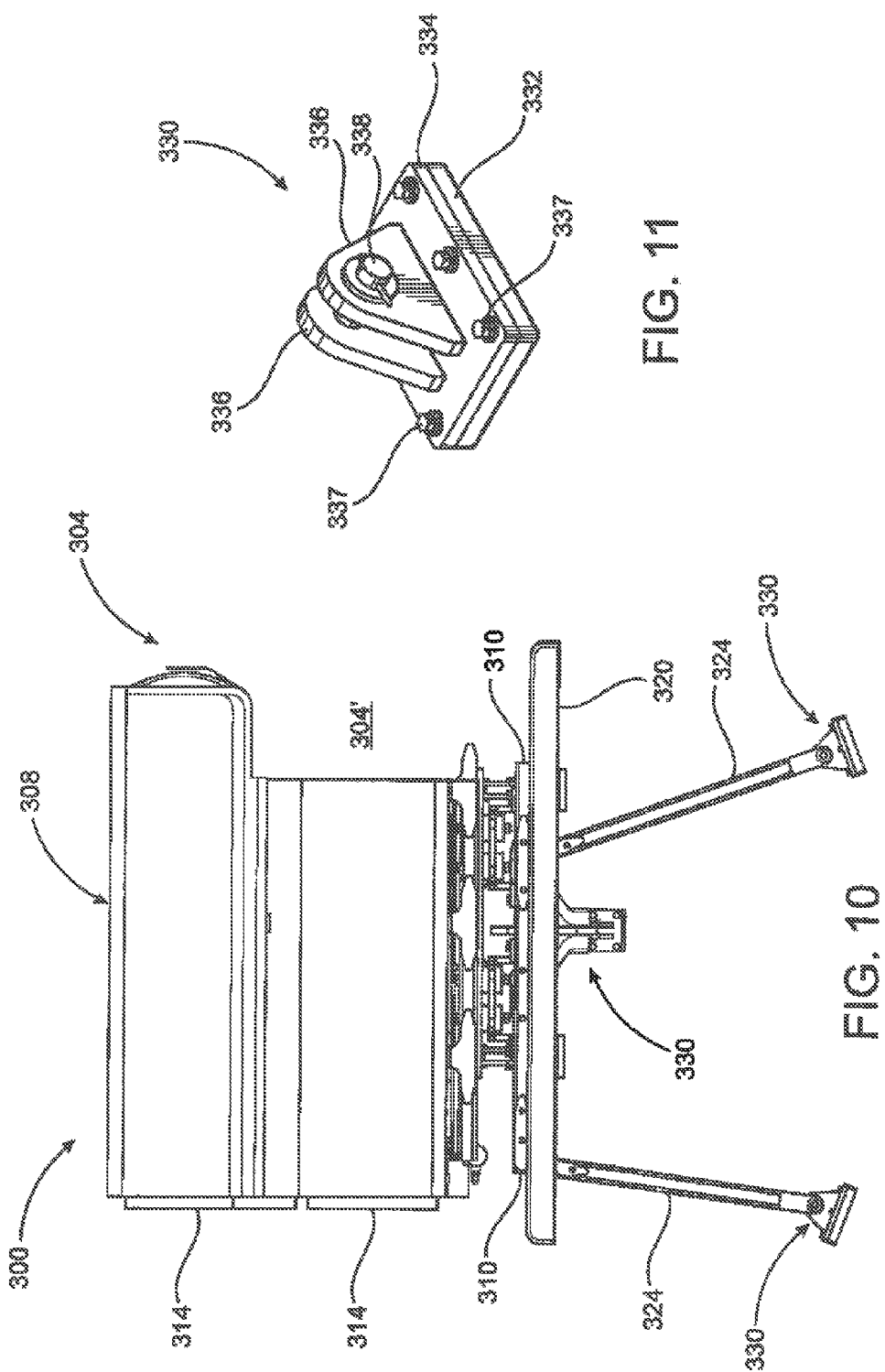

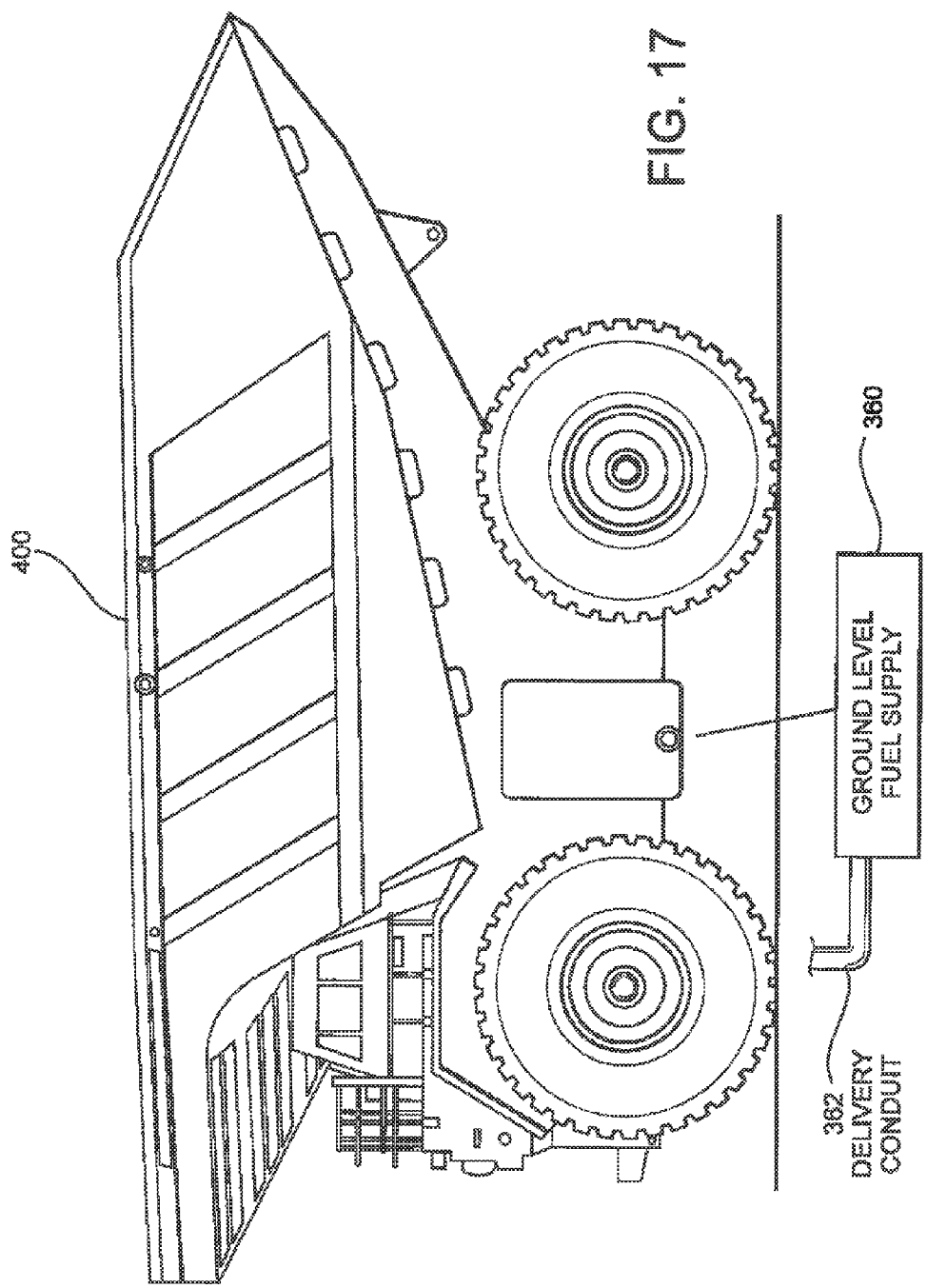

MODIFICATION OF AN INDUSTRIAL VEHICLE TO INCLUDE A CONTAINMENT AREA AND MOUNTING ASSEMBLY FOR AN ALTERNATE FUEL

CLAIM OF PRIORITY

The present application is a continuation-in-part application of previously filed, now pending application having Ser. No. 13/478,885 filed on May 23, 2012 which is a continuation-in-part application of previously filed, now pending application Ser. No. 13/234,995, filed on Sep. 16, 2011 incorporated herein by reference.

BACKGROUND OF THE INVENTION

1. Field of the Invention

This invention relates to a system, including cooperative structure, which facilitates the efficient disposition of a mounting assembly, structured for containment and support of an alternate or auxiliary fuel supply, on a heavy duty industrial vehicle, such as a mine haul dump truck. The mounting assembly is mounted on and/or within a containment area disposed on the vehicle and dimensioned and configured to retain the mounting assembly in laterally adjacent, exposed relation to an operator area of the vehicle. As such, the mounting assembly and the containment area are cooperatively disposed and structured to facilitate storage of and operative communication of the alternate fuel with the powering engine of the vehicle.

2. Description of the Related Art

Mine haul trucks are off-highway, two axle, rigid dump trucks, specifically engineered for use in high production mining and heavy duty construction environments. As such, haul truck capacities typically range from 50 short tons (45 tons) to 400 short tons (363 tons). In addition, the largest and highest payload capacity of such mine haul trucks is referred to as "ultra class" trucks. This ultra class includes haul trucks having a payload capacity of at least 300 short tons or greater. Numerous manufacturers throughout the world produce such mammoth vehicles which are engineered for both performance and long operable life. Trucks of this type are developed specifically for high production duty wherein material is transported in large quantities in order to lower transportation costs on a cost-per-ton basis.

Typically mine haul trucks are powered by either direct drive diesel or diesel electric power trains frequently including a multiple horse power turbo charged diesel engine. Due to the exceptional size and weight of such vehicles, they cannot be driven on public access roads, but are ideal for high production environments wherein massive quantities of material must be moved, handled, relocated, etc. on a continuous or regular basis.

Accordingly, it is well recognized that distillate fuels, specifically diesel, are used as the primary fuel source for such vehicles. Attempts to maximize the operational efficiency, while maintaining reasonable safety standards, have previously involved modified throttle control facilities. These attempts serve to diminish adverse effects of control mechanisms which may be potentially harmful to the vehicle engine operation as well as being uneconomical. Typical adverse effects include increased fuel consumption and wear on operative components. Therefore, many diesel engines and the vehicles powered thereby are expected to accommodate various types of high capacity payloads and provide maximum power for relatively significant periods of operation. As a result, many diesel engines associated with heavy duty and off-road vehicles are commonly operated at maximum or near maximum capacity resulting in an attempted maximum power delivery from the vehicle engine and consequent high rates of diesel consumption. It is generally recognized that the provision of a substantially rich fuel mixture in the cylinders of a diesel engine is necessary for providing maximum power when required. Such continued high capacity operation of the vehicle engine results not only in wear on the engine components but also in high fuel consumption rates, lower operating efficiencies, more frequent oil changes and higher costs of operation.

Accordingly, there is a long recognized need for a fuel control system specifically intended for use with high capacity, off-road vehicles including mine haul vehicles of the type generally described above that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuel can comprise natural gas or other appropriate gaseous type fuels, wherein distillate fuel would typically include diesel fuel.

Such a preferred and proposed fuel control system should be capable of regulating the composition of the operative fuel mixture on which the vehicle engine currently operates to include 100% distillate fuel, when the vehicle's operating mode(s) clearly indicate that the combination of gaseous and distillate fuels is not advantageous. Further, such a proposed fuel control system could have an included secondary function to act as a general safety system serving to monitor critical engine fuel system and chassis parameters. As a result, control facilities associated with such a preferred fuel control system should allow for discrete, user defined control and safety set points for various engine, fuel system and chassis parameters with pre-alarm, alarm and fault modes.

In addition, the operation of such a fuel control system would be facilitated by the inclusion of a preferred mounting assembly for the alternate fuel supply. As such, the included and preferred mounting assembly would be readily adaptive for use on different vehicles while facilitating the secure, safe and efficient distribution of the alternate fuel in the intended manner.

SUMMARY OF THE INVENTION

This invention is directed to a system and attendant structure operative to support an alternate fuel supply on a vehicle, wherein the fuel supply may be used with an improved fuel control system. The fuel control system comprises technology that allows for the safe and efficient use of a gaseous fuel such as, but not limited to, liquid natural gas (LNG), in combination with a predetermined quantity of conventional distillate fuel, such as diesel fuel. As a result, the composition of an "operative fuel mixture" used to power a vehicle engine will, dependent on the operating modes of the vehicle engine and operating characteristics of the engine during the operating modes, be either a predetermined combination of gaseous fuel and distillate fuel or substantially entirely distillate fuel, absent any contribution of gaseous fuel.

At least one preferred embodiment of the system of the present invention is directed to a mounting assembly for supporting the alternate fuel supply on the vehicle. While the mounting assembly is specifically adapted for the operable support and positioning of an auxiliary or alternate fuel supply, it is also structurally and operationally capable of mounting and/or supporting a primary fuel supply. In addition, the vehicle with which the mounting assembly of the present invention is utilized may vary significantly, but the system and structure of the present invention is primarily directed to the operation of mine haul vehicles, of the type set forth below, as well as bulldozers, and other heavy duty commercial vehicles. As such, the operation of these types of heavy duty industrial vehicles is significantly benefited or enhanced by the provision of an auxiliary, or alternate fuel supply such as, but not limited to, liquid natural gas (LNG), used in combination with an improved fuel control system and an electronic control unit incorporated therein:

CATERPILLAR Heavy Duty Industrial Vehicles, Models: 797, 793, 789, 785, 777, 775, 773

KOMTASU Heavy Duty Industrial Vehicles, Models: HD1500-7, HD785-7, HD605-7, HD465-7, HD405-7, HD325-7

TEREX Heavy Duty Industrial Vehicles, Models: TR100, TR70, TR60, TR45, TR35

HITACHI Heavy Duty Industrial Vehicles, Models: EH1700-3, EH1100-3

EUCLID Heavy Duty Industrial Vehicles, Models: R260, R220, R190, R170, R150, R130B, R130M, R130, R120E, R100, R90C, R90, R85B, R85, R65C, R65

Accordingly, the mounting assembly of the present invention comprises a containment structure for the fuel supply (LNG) in the form of at least one or a plurality of at least two fuel tanks. Each of the one or more fuel tanks stores the LNG or other fuel on the interior thereof during periods of non-use or operation of the vehicle. The mounting assembly further includes a housing structured to at least partially enclose the one or more fuel tanks on the interior thereof. A base is mounted on the vehicle in supporting relation to both the housing and the containment structure or fuel tanks. Therefore, the containment structure is at least partially enclosed and accordingly protected against unintended impact or contact by other objects, vehicles, etc. in the working environment of the vehicle on which the fuel supply and containment structure are disposed.

Therefore, one feature of the system and accompanying structural features of the present invention includes the aforementioned mounting assembly structured for containment and support of the alternate fuel supply. In addition and at least partially for the reasons set forth above, another feature of the present invention comprises the establishment of a predetermined containment area defined on and considered a part of the vehicle. Moreover, the containment area is defined and structured in a location which facilitates the operative communication of the alternate fuel supply, disposed within the mounting assembly, with the remainder of the fuel control system serving to regulate the distribution of fuel to the powering engine of the vehicle. Moreover, the containment area and the operatively disposed mounting assembly are collectively positioned in laterally adjacent and exposed relation to an operator area of the mine haul vehicle. In addition, the mine haul vehicle typically includes the operator area defined by an enclosed operator cab.

The mounting assembly and the containment area are thereby cooperatively disposed and structured to facilitate storage of the alternate fuel and its operative delivery to the powering engine of the mine haul vehicle. The containment area is more specifically described as being directly adjacent to an exterior side or corresponding side wall of the enclosed operator cab. When the mounting assembly is operatively disposed in the containment area in its intended position, it is directly exposed to the operator cab. More specifically, such an "exposed" relation or position of the mounting assembly, relative to the operator cab, may be more specifically defined by the placement of the mounting assembly in a position which at least partially obstructs the normal field of vision of an operator occupying the operator cab. As a result, auxiliary viewing capabilities are also preferably mounted on the mine haul truck so as to overcome any visual restrictions of the operator due to the exposed positioning of the mounting assembly when mounted in the adjacently disposed containment area.

More specifically, additional viewing components may be utilized, such as one or more cameras or other viewing facilities. The cameras, etc. are operative to observe and transmit a display of the obstructed field of vision to a real time display located in a position to be easily viewed by the operator. The camera(s) or other appropriate viewing facilities may be considered a part of or associated with the mounting assembly or may be located independently thereof, in a location which best facilitates the observance of the area obstructed from normal viewing by the operator. An appropriate monitor or other display screen may thereby be disposed within the interior of the enclosed operator cab, or in other appropriate positions, in order to enhance the portion of the operator's field of vision which is obstructed by the exposed positioning of the mounting assembly within the containment.

Additional features of the predetermined containment area comprise a platform, cover or like support facility located immediately adjacent to and exteriorly of the operator cab. When the platform is operatively position, it may be disposed in covering, overlying relation to operative components of the mine haul vehicle yet have sufficient structural integrity and overall dimension as to adequately support a preferred mounting assembly. It is emphasized that different mounting assemblies may be utilized for support and storage of the alternate fuel supply.

Yet another preferred embodiment of the present invention is directed to a system for incorporating an alternate fuel supply on a mine haul vehicle and is operatively and structurally similar, yet distinguishable from, the embodiments of the present invention as described above. More specifically, this additional preferred embodiment comprises a containment area located on the mine haul vehicle in laterally adjacent relation to an operator cab. The containment area is structured and dimensioned to maintain a mounting assembly therein. As with the previously described embodiments, the mounting assembly is structured for containment and support of an alternate fuel supply which may be used to power the driving engine of the mine haul vehicle. It is also noted in greater detail hereinafter, this embodiment of the system of the present invention is specifically, but not necessarily exclusive, intended for use in a CATERPILLAR 793 model mine haul truck. Accordingly, the containment area and the mounting assembly as well as the various components thereof are collectively and cooperatively configured to facilitate conformance and disposition thereof within the vehicle such as, but not limited to, a CATERPILLAR Model 793 mine haul truck as indicated above.

The mounting assembly comprises a housing disposed in retaining relation to at least one fuel tank for containment of the alternative fuel supply. In addition the mounting assembly further comprises a base disposed in interconnecting relation between the housing and supporting portions of the mine haul vehicle. Further, the containment area includes an access structure disposed in covering and/or overlying relation to an engine compartment of the vehicle. Moreover, the housing is cooperatively dimensioned and configured to facilitate selective positioning of the access structure and an entrance to the operator cab in an operatively open orientation, when such is desired.

Further, at least a portion of the base may be disconnected from the housing in order to movably dispose the housing, while remaining within the containment area, between at least a first orientation and a second orientation. The first orientation may be accurately described as a normally operative placement thereof while the vehicle is being operated. However, in order to provide a more complete access to the engine compartment area or portions of the mounting assembly itself, the housing may be disposed in the aforementioned second orientation. As also noted with the previously described embodiments, at least a portion of the base is removably connected to the vehicle to facilitate a detachment of the housing from the vehicle for purposes of repair and/or maintenance.

The movement of the housing between the first and second orientations is facilitated through the use of a positioning assembly. The preferred positioning assembly may be used as a separate, removably connected tool type assembly which may be selectively disposed in interconnecting relation between the base and the housing. Further, the positioning assembly tool may include a fluid activated piston and cylinder assembly powered from an outside or independent source of fluid, such as, but not limited to, hydraulic fluid. When activated the positioning assembly tool will serve to force and concurrently support the housing as it is moved from the first orientation to the second orientation. Cooperatively structuring of the base and in particular a plurality of support members of which the base is comprised, will serve to support the housing when in either the first or second orientation.

More specifically, the base comprises a plurality of support members including a first predetermined number or set which are detachably connected to the housing but serve to support it when in the first orientation. However, when the positioning assembly tool is operatively connected to the base and housing, the housing may be detached from the first set of support members. Concurrent to such detachment, the second set of support members are movably connected to the housing during the movement or positioning of the housing from the first orientation to the second orientation. Once in the second orientation, the second set of support members of the base will support the housing, independent of the positioning assembly tool or in cooperation therewith, as desired.

Additional structural and operative features of this preferred embodiment of the present invention includes a substantially angled orientation of the housing as it extends along its length between a lower end and an upper end portion. The terms "upper" and "lower" are used herein to accurately describe locations of portions of the housing within the containment area as represented in the accompanying Figures, described in detail hereinafter. More specifically, the upper end portion is angled outwardly in substantially transverse relation to a remainder of the housing. As such, the upper end portion is disposed in laterally adjacent relation to an entrance of an operator cab of the mine haul vehicle. However, the upper end portion, as well as a remainder of the housing is cooperatively dimensioned and configured to facilitate an opening of the operator cab entrance, even when the housing is in the first orientation. Such operative opening of the operator cab entrance may extend through at least a forty-five degree opening "door swing" into the containment area.

Somewhat similarly, the housing is disposed in overlying and at least partially adjacent relation to the engine compartment of the vehicle and in overlying but spaced relation from an access structure to the engine compartment. The configuration and dimension of the housing facilitates an operative opening of the access structure which at least partially covers or overlies the engine compartment. The above noted cooperative dimensioning and configuring of the housing will serve to provide functional access to the engine compartment and/or facilitate the movement of an operator into and out of the operator cab, even when the housing of the mounting assembly is in the first orientation.

Structural and operative features distinguishing this preferred embodiment from those previously described include the base and more specifically at least some or all of the plurality of support members being disposed at least partially within the interior of the engine compartment. As a result, at least some of the support members are dimensioned so as to extend outwardly from the interior of the engine compartment into a location where the support members are connected in supporting relation to the housing. As a result, the supporting function of the base does not require an inordinate amount of room directly associated with the containment area or considered a part thereof.

Yet additional structural and operative features of the present invention include the mounting assembly comprising a shock absorber assembly disposed in interconnecting relation between the housing and the base. As such the shock absorber assembly may preferably include a plurality of isolation mounts disposed between the base and the housing and structured to restrict the transmission of vibration to the housing during operation of the vehicle.

Safety restrictions associated with the operation and maintenance of mine haul vehicles of the type referred to herein frequently require that the re-fueling thereof takes place from the ground surface on which the vehicle is positioned. Accordingly, the alternate fuel supply, or the one or more plurality of tanks associated therewith are also disposed and structured to facilitate the filling from the ground surface level of the vehicle.

Disposition of the containment area in immediate, laterally adjacent relation to the operator area or enclosed operator cab defines its placement beneath and at least partially underlying relation to a frontal portion of the dump truck body of the mine haul vehicle. Therefore, the containment area and mounting assembly are at least partially enclosed. However, while the mounting assembly is in the containment area and in the aforementioned exposed position relative to the operator cab, it is also at least partially open, as described in greater detail hereinafter. Also, this disposition of the mounting assembly within the containment area provides an effective and efficient placement on the mine haul vehicle to facilitate the operative communication of the alternate fuel with the powering engine of the vehicle, through interaction with the fuel control system, as set forth above.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 10 is a front view in partial phantom of the preferred embodiment of the FIGS. 8 and 9.

FIG. 11 is a perspective detailed view one component of FIG. 8.

FIG. 17 is a side view of a mine haul vehicle of the type CATERPILLAR Model 793 with which the embodiment of FIGS. 8 through 16 may be used.

Like reference numerals refer to like parts throughout the several views of the drawings.

DETAILED DESCRIPTION OF THE PREFERRED EMBODIMENT

Figure 1:
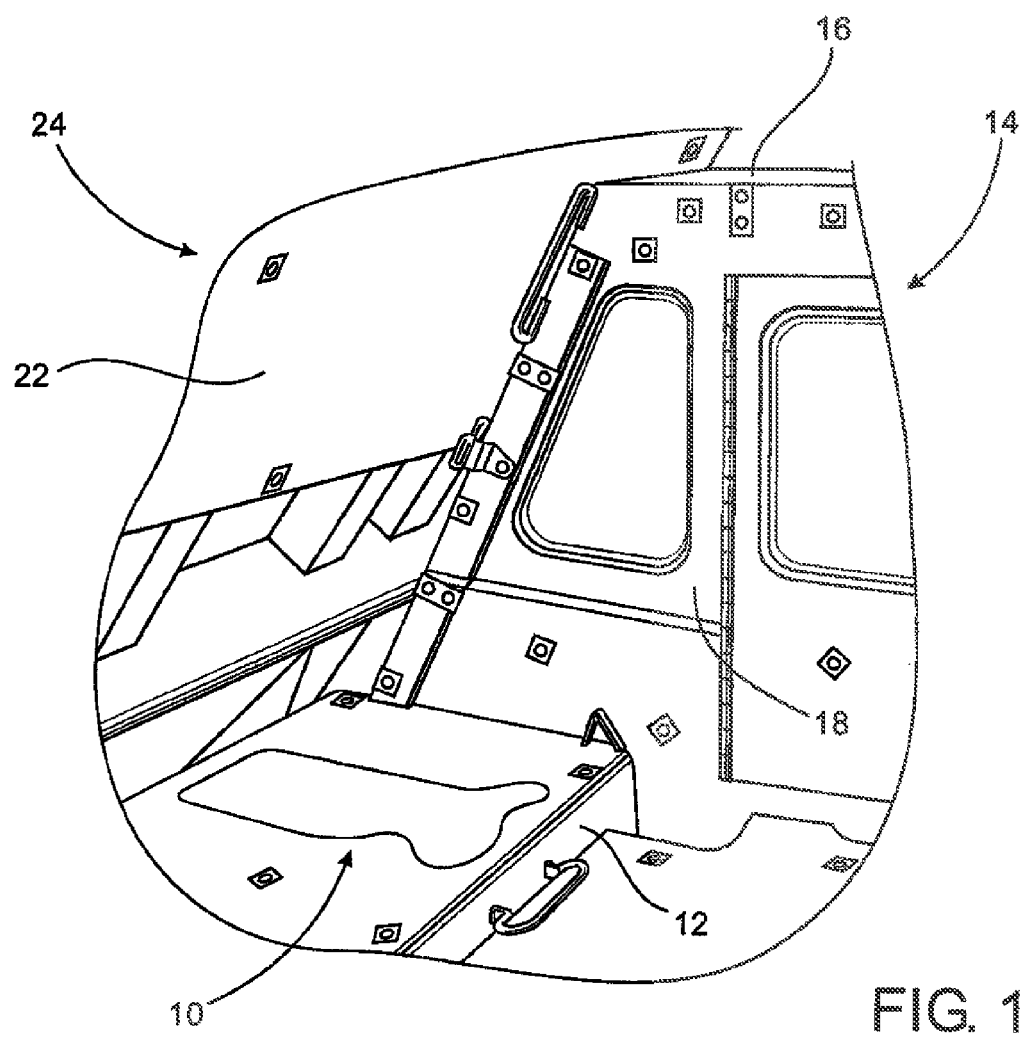
FIG. 1 is a perspective view of a containment area defining a portion of the present invention, mounted and considered a part of an industrial vehicle, specifically including a mine haul dump truck vehicle and an operator area of the vehicle.
Figure 2:
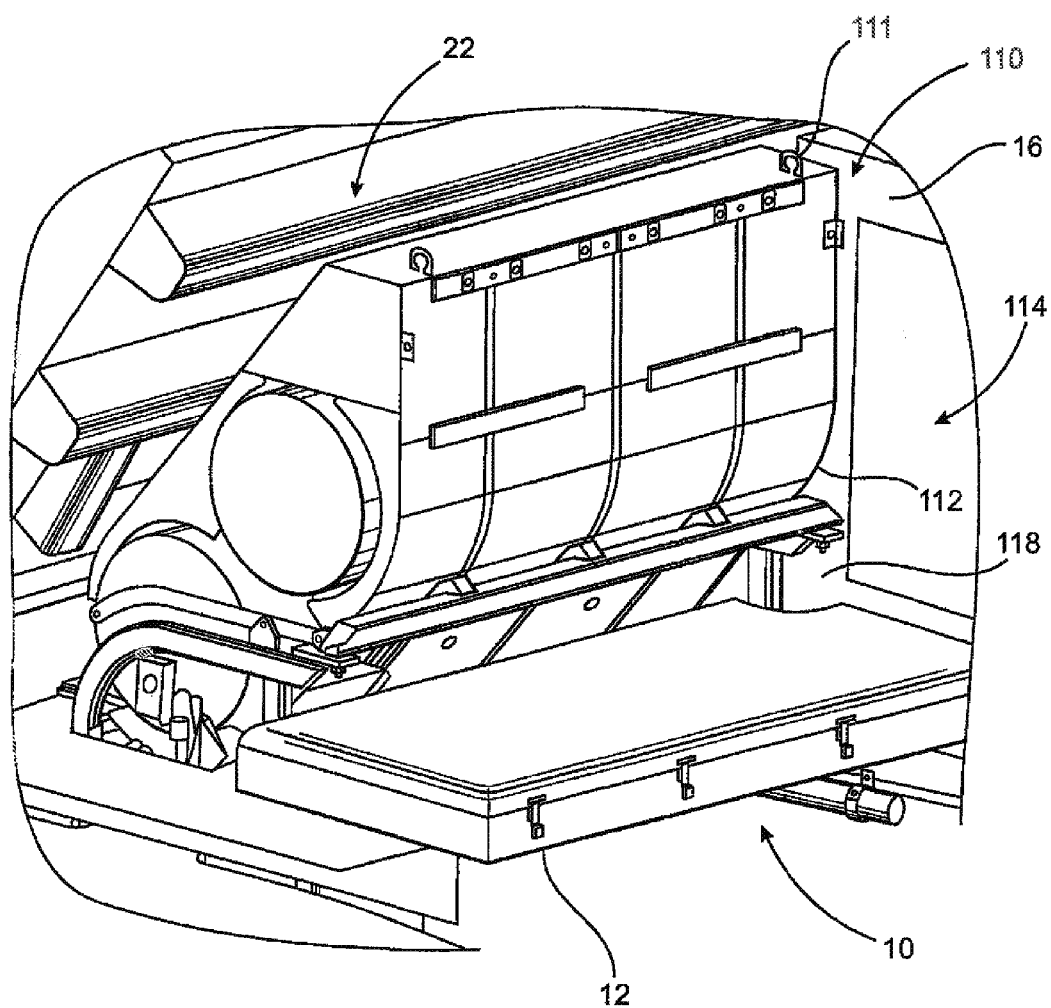
FIG. 2 is a perspective view in partial cutaway of one preferred embodiment of a mounting assembly of the present invention disposed on or within the containment area of the embodiment of FIG. 1 in a first orientation.
Figure 3:
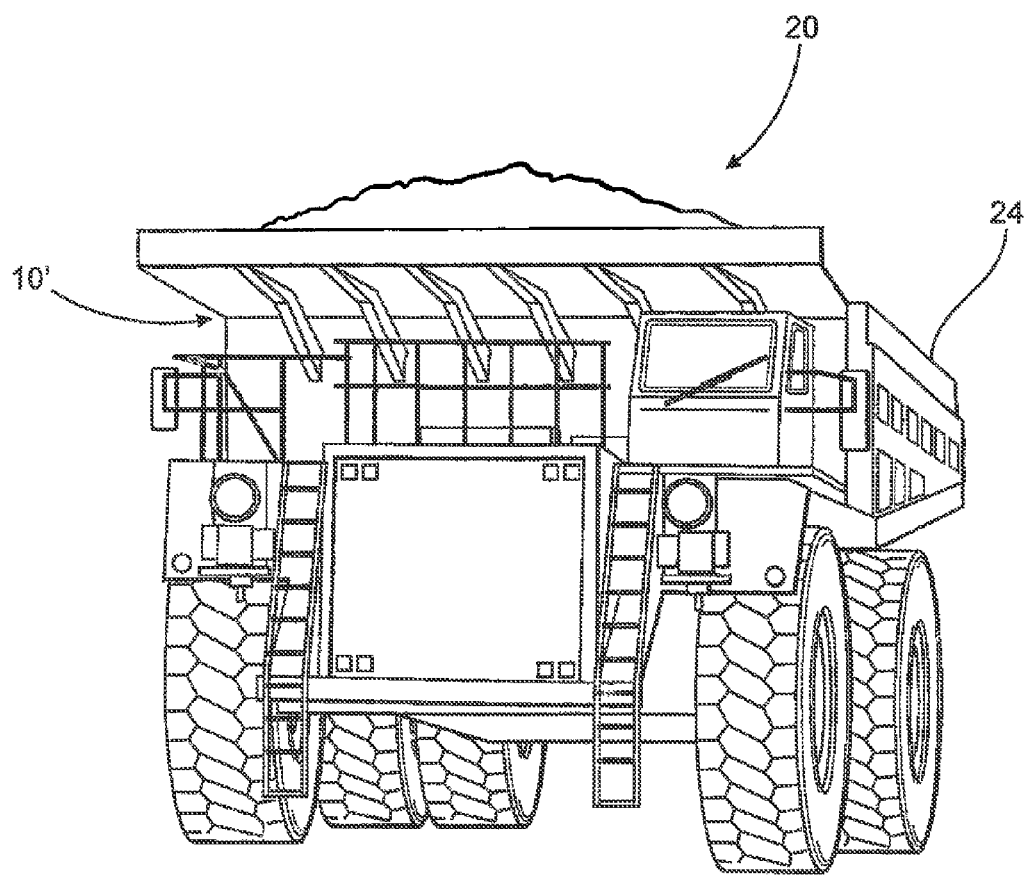
FIG. 3 is a perspective view of an industrial vehicle, specifically including a mine haul dump truck vehicle which includes the containment area of the embodiment of FIG. 1.

As represented in FIGS. 1 through 3, the present invention is directed to a system, cooperative structuring and attendant facilities for operatively disposing a mounting assembly 110 within a containment area generally indicated as 10. The containment area 10 is disposed on and is considered and integrated part of an industrial or commercial vehicle specifically including a mine haul dump truck vehicle generally indicated as 20 in FIG. 3. As such, the containment area 10 includes a platform 12 and a sufficiently dimensioned and configured area to operatively dispose at least one preferred embodiment of the mounting assembly 110 therein generally indicated in FIG. 2 and described in greater detail in FIGS. 4 through 6.

As set forth above, the industrial or commercial vehicle 20 may be in the form of a mine haul dump truck vehicle such as, but not limited to a CATERPILLAR model 777. However, as set forth above the versatility of the mounting assembly 110 and the dimension, configuration and overall structure of the cooperative containment area 10 allows the mounting assembly to be used on a variety of similar industrial or commercial vehicles including different makers and models of such vehicles, as indicated above. Further by way of reference and clarity, the containment area 10 is generally located on the vehicle, as at 10' and with reference to both FIGS. 1 and 3, the containment area 10, 10' is located immediately and laterally adjacent to an operator area generally indicated as 14. Moreover, typical of mine land haul vehicles 20, the containment area 14 comprises and enclosed operator cab 16 having an exterior wall or like partition member 18 disposed in at least partially confronting or immediately adjacent relation to the containment area 10 including the platform 12. As such, operative disposition of the mounting assembly 110 in the containment area 10 and on or at least directly associated with a platform 12 serves to disposed the mounting assembly 110 in immediate laterally adjacent relation to the operator area 14 and/or enclosed operator cab 16. The disposition of the containment area 10 laterally adjacent to the operator area 14 further serves to dispose the mounting assembly 110 in a visually obstructing or "exposed" relation relative to the interior of the operator cab 16. As a result the field of vision normally available to an operator in the operator cab 16 will be somewhat blocked of hindered due to the "exposed" laterally adjacent relation of the mounting assembly 110 through the operator area 14 and more specifically the operator cab.

Therefore, in order to enhance the obstructed field of vision of an operator within the operator cab 16, the vehicle 20 may be additionally equipped with an auxiliary viewing facility comprising at least one camera and a viewing monitor or display. The at least one camera, not shown for purposes of clarity can be located in any of a plurality of appropriate positions and orientations on the vehicle 20 so as to enhance the obstructed view of the operator created by the exposed disposition of the mounting assembly 110. Similarly, the display or monitor is located preferably on the interior of the operator cab or in another appropriate location which is clearly viewable by an operator so as to overcome the at least laterally obstructed view of the operator from the operator area 14 or enclosed cab 16.

As further represented in FIGS. 1 and 2, additional structural features define by or associated with the containment area 10 and the operatively disposed mounting assembly 110, as represented in FIG. 2, includes the mounting assembly 110 disposed in at least partially enclosed or at least minimally covered relation relative to a frontal portion 22 of the dump truck body 24. More specifically, the mounting assembly 110 is disposed at least partially beneath and in underlying relation to the overlying position of the frontal portion 22 of the dump truck body 24. With reference to FIG. 3, a frontal portion of the containment area 10 still remains at least partially open. Therefore, the placement or installation of the mounting assembly 110 within the containment area 12 may be accomplished, at least in part, by a raising or opening of the truck body 24 such that the frontal portion 22 thereof is outwardly spaced away from the containment area 12. Appropriate hooks or like connectors 111 are mounted on the housing 112 of the mounting assembly 110 to facilitate its positioning, such as by crane or other appropriate lifting device. Hoverer, as clearly represented in FIG. 2 the operative disposition of the mounting assembly 110 is located immediately and laterally adjacent to the operator area 14 including the enclosed cab 16 so as to abut or be minimally spaced away from a the lateral sidewall portion 18 as generally set forth above. Moreover, when the installation of the mounting assembly 110 is complete, the dump truck body 24 may be conventionaly raised and lowered so as to assume and facilitate the normal operation of the vehicle 20.

Figure 4:
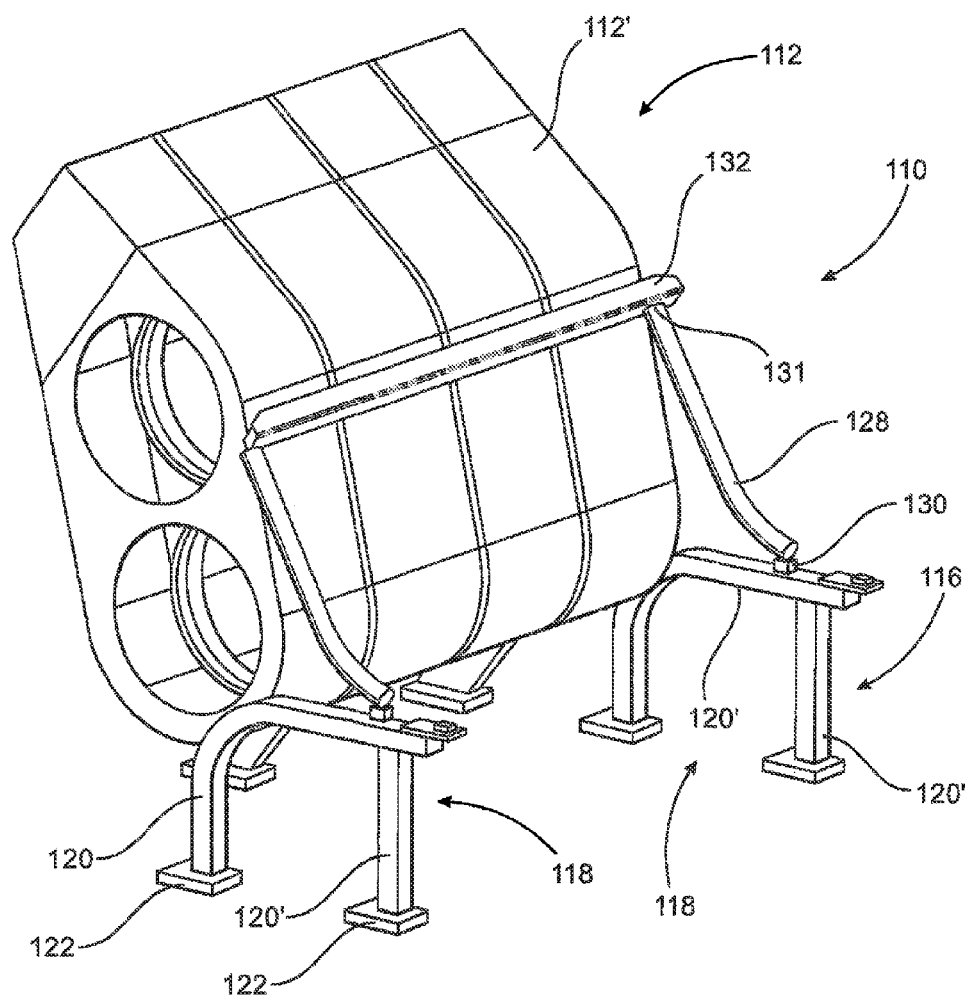
FIG. 4 is a rear perspective view in at least partially schematic form of one embodiment of a mounting assembly of the present invention, wherein the housing thereof is in a second orientation.
Figure 5:
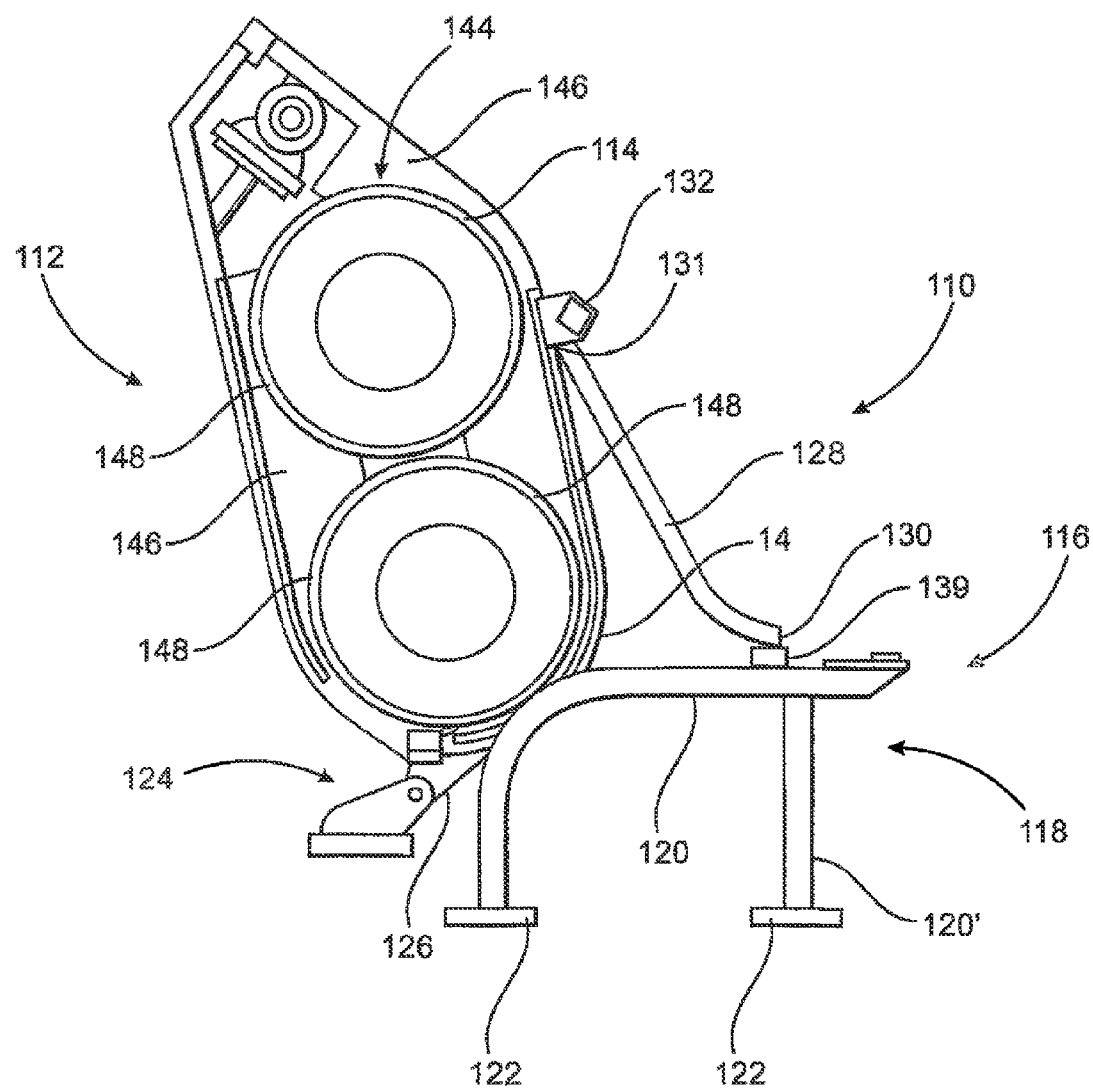
FIG. 5 is a side view of the embodiment of FIG. 4.
Figure 6:
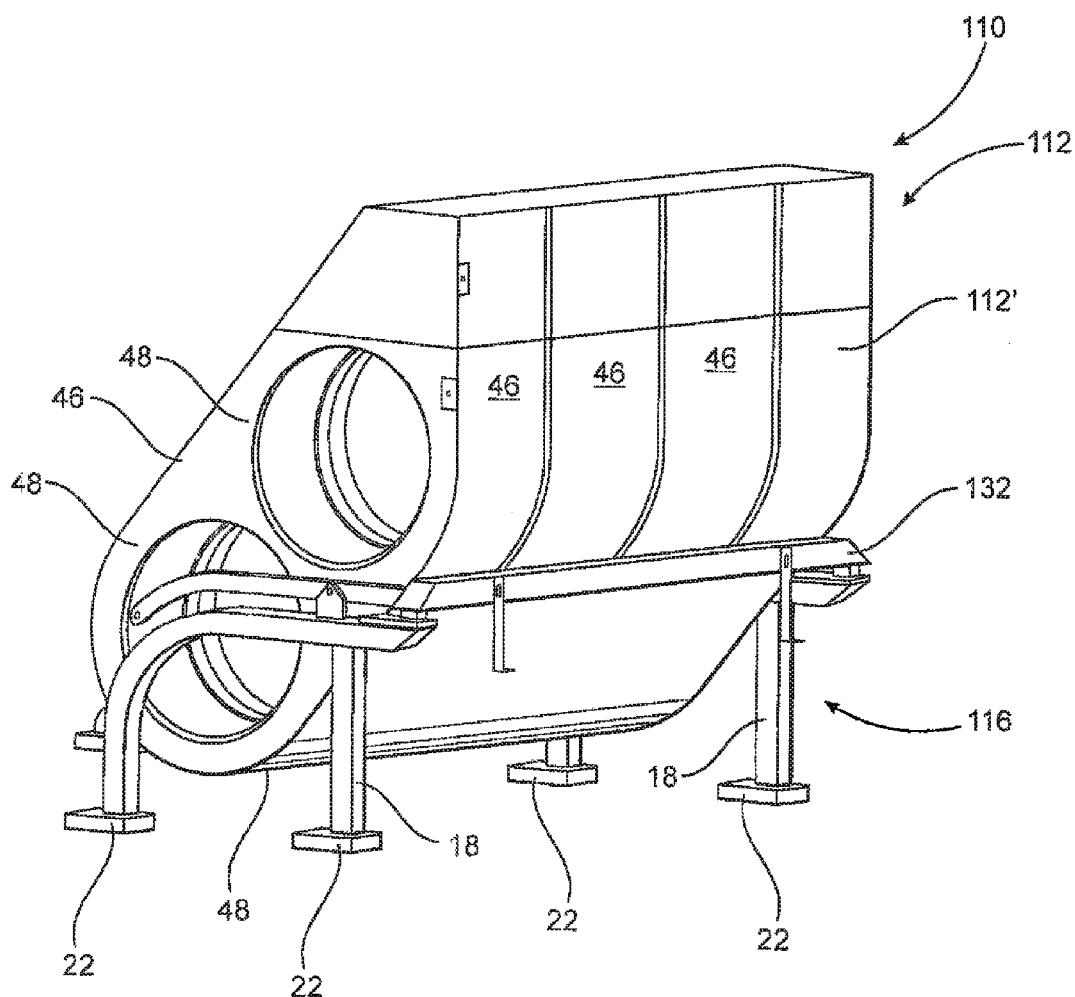
FIG. 6 is a rear perspective view in at least partially schematic form of the embodiment of FIGS. 4 and 5 of the mounting assembly, wherein the housing thereof is in the first orientation.

With primary reference to FIGS. 4-6, the present invention is directed to a mounting assembly generally indicated as 110 including a movably interconnected housing generally indicated as 112. The mounting assembly 110 is specifically, but not exclusively, intended for use on heavy duty "mine haul" vehicles, bulldozers or other vehicles of the type generally set forth above. As emphasized herein the mounting assembly is specifically dimensioned and configured to facilitate its operative placement within the containment area 10 defined on or considered a part of the mine haul dump truck vehicle.

More specific structural details of the mounting assembly 110 of the embodiment of FIGS. 2 and 4-6 include the housing 112 being structured to include the alternate fuel supply disposed within a containment area 10. The housing 112 comprises at least one but in certain practical applications, a plurality of fuel tanks 114. As also represented, the housing 112 is supported and interconnected to the vehicle 20 by means of a base assembly, generally indicated as 116. The base 116 includes a plurality of support legs 118 each of which include leg segments 120 and 120' having the lower end thereof fixedly secured, such as by welding the accompanying mounting pads 122 to the platform 12 or other appropriate portion of the containment area 10 of the vehicle 20, on which the mounting assembly 110 is disposed.

The base 116 may also include a connecting assembly comprising at least one but in certain practical applications a plurality of at least two hinge structures generally indicated as 124. Each of the hinge structures 124 are connected to an appropriate link 126 or like structure secured to an under portion of the housing 114 as clearly represented. The structural and operative features of each of the one or more hinge structures 124 is such as to facilitate the selective positioning or movement of the housing 112 as well as the containment structure or fuel tanks 114 between a first orientation, as represented in FIGS. 2 and 6, and a second substantially upright orientation, as represented in FIGS. 4 and 5. Accordingly, the connecting hinge structures 124 serve to movably interconnect the housing 112 to the containment area 10 and further serve to support the housing 112 at least when the housing is in the second orientation of FIGS. 4 and 5. The disposition of the hinge structures 124 also add to the support of the housing 112 when it is in the first orientation, as clearly represented in FIG. 6. The one or more hinge structures 124 may be considered a part of the base 16 due to their support of the housing 112 when at least in the second orientation and most probably when in both the first and second orientations. However, dependent upon the structure, configuration and dimension of the mine haul vehicle 20 and containment area 10 in which the mounting assembly 110 is disposed, the one or more hinge structures 124 may be considered independent of the base 116 by virtue of their location being not directly adjacent to or operatively associated with the base 116.

Further with regard to the selective positioning of the housing 112 in either the first or second orientations, the mounting assembly 110 further includes a retaining assembly comprising at least one, but preferably a plurality of at least two retaining arms or bars 128. The one or more retaining arms 128 serve to maintain and at least partially support the housing 112, at least when it is in the second orientation as clearly demonstrated in FIGS. 2, 4 and 5 when in their operative position. Each of the retaining arms 128 include opposite ends removably connected, as at 130, to the correspondingly disposed support arm 118. The opposite end of each of the retaining arms 128 is removably connected, as at 131, to the housing 112 and more specifically to a brace or cross brace structure 132.

Moreover, each of the retaining arms 128 is removed from the stored orientation and disposed in the supporting orientation of FIGS. 4 and 5. When in such a supporting orientation, the opposite end 130 is removably connected to the upstanding connecting flange 139, by a threaded knob or like connector. The removable but stable interconnection of the opposite ends 130 and 131, as at 130' and 131', to the mounting flange 139 and the base 116, respectively, will serve to assure that the retaining arms 128 are maintained in their operative, supporting, retaining position between the base 116 and the housing 112 and/or brace 132. However, the removable interconnection of each of the retaining arms 128 in their supporting, retaining position facilitates the easy disconnection of the retaining arms 128 for selective disposition in their stored orientation in order to dispose the housing 112 in the first orientation.

The stability of the containment structure, comprising the one or more fuel tanks 114 within the interior of the housing 112, is further enhanced by a stabilizing assembly 144 also at least partially disposed on the interior of the housing 112. The stabilizing assembly 144 includes at least one but preferably a plurality of stabilizing members 146 disposed in spaced relation to one another and collectively extending along the length of the one or more fuel tanks 114 defining the containment structure for the fuel supply. In addition, the stabilizing members 46 may be disposed on opposite sides of fuel tanks 114. In addition, each or at least some of the stabilizing members 146 include a recessed segment or portion 148 at least partially dimensioned and configured to the corresponding exterior configuration of each of the fuel tanks 114. As such, the plurality of stabilizing members 146 can be defined as collectively and at least partially surrounding and/or "sandwiching" the plurality of fuel tanks 114 there between. By virtue of this cooperative disposition and structure, movement or inadvertent, unintended displacement of the one or more fuel tanks 14 within the interior of the housing 112 is eliminated or significantly restricted. In addition, the stabilizing assembly 146 can be defined by a plurality of the stabilizing members 148 which may vary in number, size, configuration, etc. so as to accommodate a confronting engagement or relation with the one or more fuel tanks 114 in a manner which facilitates the ability to restrict the displacement or movement of the fuel tanks 114 within the interior of the housing 112, whether the housing 112 is in either the aforementioned first or second orientations.

Figure 7:
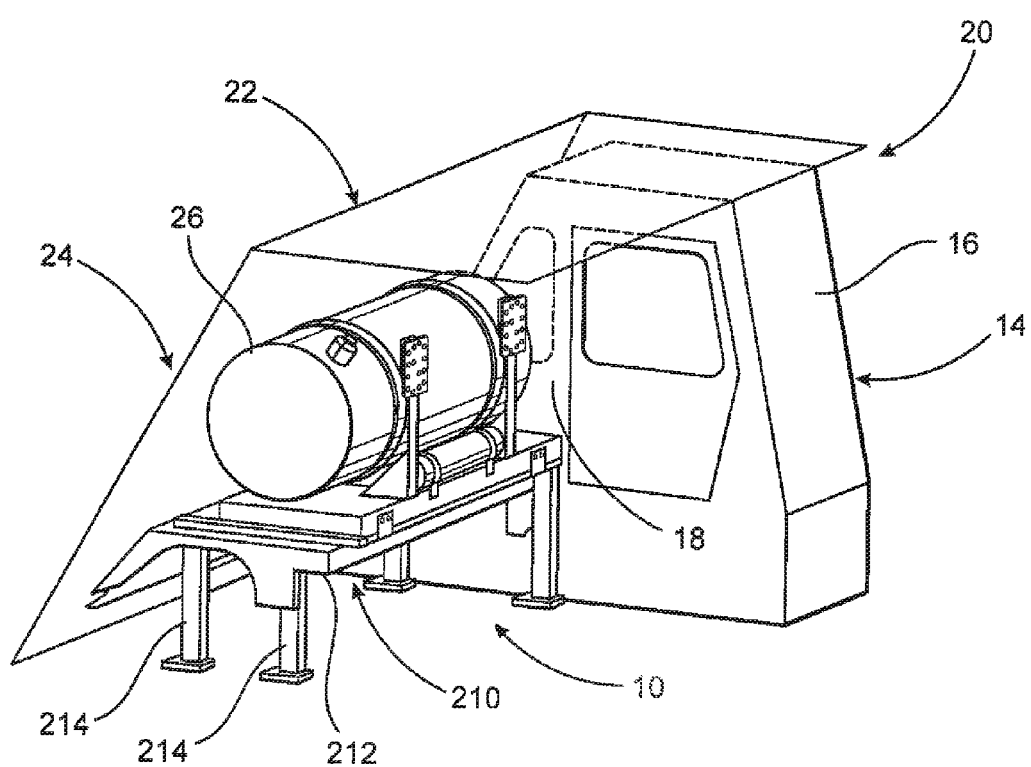
FIG. 7 is another preferred embodiment of the mounting assembly, disposed within the predetermined containment area of the mine haul vehicle.

The versatility of the containment area 10 is further represented in at least partially schematic form in the embodiment of FIG. 7. In one preferred embodiment the mounting assembly 110 of the embodiment of FIGS. 2 and 4 through 6, may be operatively disposed in the containment area 10. However, other mounting assemblies having a variety of different but appropriate structural features may be utilized with a variety of different vehicles, specifically including mine haul vehicles, as set forth in detail herein. More specifically, in the additional preferred embodiment of FIG. 7 the mounting assembly is generally indicated as 210 and includes a base 212 having a support frame or like structure comprising a plurality of legs 214. In addition, a containment structure generally indicated as 216 is in the form of at least one fuel tank for storage and support for the alternate and/or auxiliary fuel supply such as (LNG). As with the mounting assembly 110 the additional preferred embodiment of the mounting assembly 210 is located in the containment area 10 and in immediate, laterally adjacent relation to the operator area 14 which may be in the form of the enclosed operator cab 16. As such at least a portion of the mounting assembly 210 including, but not limited to, the containment structure or one or more fuel tanks 216 are positioned in an "exposed" or visually obstructing relation as relates to the field of vision of an operator within the compartment area 14. Accordingly, the aforementioned auxiliary viewing assembly, including at least one camera and a display or monitor, is also provided for use by an operator when the mounting assembly 210 is operatively disposed within the containment area 10.

As also set forth above, the containment area 10 and the mounting assembly 210 are disposed in underlying relation to at least a frontal portion 22 of the dump truck bed 24 so as to be partially enclosed and/or protected thereby when the dump truck bed 24 is in its closed or lowered position. However, the containment area 10 is still preferably in the frontal, at least partially open location 10' of the vehicle 20 as represented in FIG. 3.

As represented in FIGS. 8 through 17, the present invention comprises an additional preferred embodiment directed to a system for mounting and alternate fuel supply on a mine haul vehicle. In more specific terms, the various operational and structural components of this additional system are specifically, but not exclusively, adapted for use on a CATERPILLAR Model 793 mine haul vehicle.

Therefore, the system of this preferred embodiment of the present invention comprises a mounting assembly generally indicated as 300 including a containment area 302 located on the vehicle in laterally adjacent relation to an operator cab 304 and above and in adjacent, at least partially overlying relation to an engine compartment 306 of the mine haul vehicle. Further, the mounting assembly 300 comprises a housing 308 including a frame portion 310 and an overlying, at least partially enclosing canopy 312. Further, the housing 308 is disposed, dimensioned and configured to support at least one, but in certain practical applications, a plurality of fuel tanks 314, each structured for containment of the alternate fuel such as liquid natural gas (LNG). The mounting assembly 300 also includes a base 316 disposed to support and interconnect the housing 308 as well as the one or more fuel tanks 314 of the alternate fuel supply to the vehicle 400. Accordingly, the housing 308 is dimensioned, disposed and configured in at least partial conformance with the containment area 302 such that mounting assembly 300 as well as the containment area 302 are specifically adapted to conform to the dimensions and configurations of the aforementioned mine haul vehicle 400.

Figure 8:
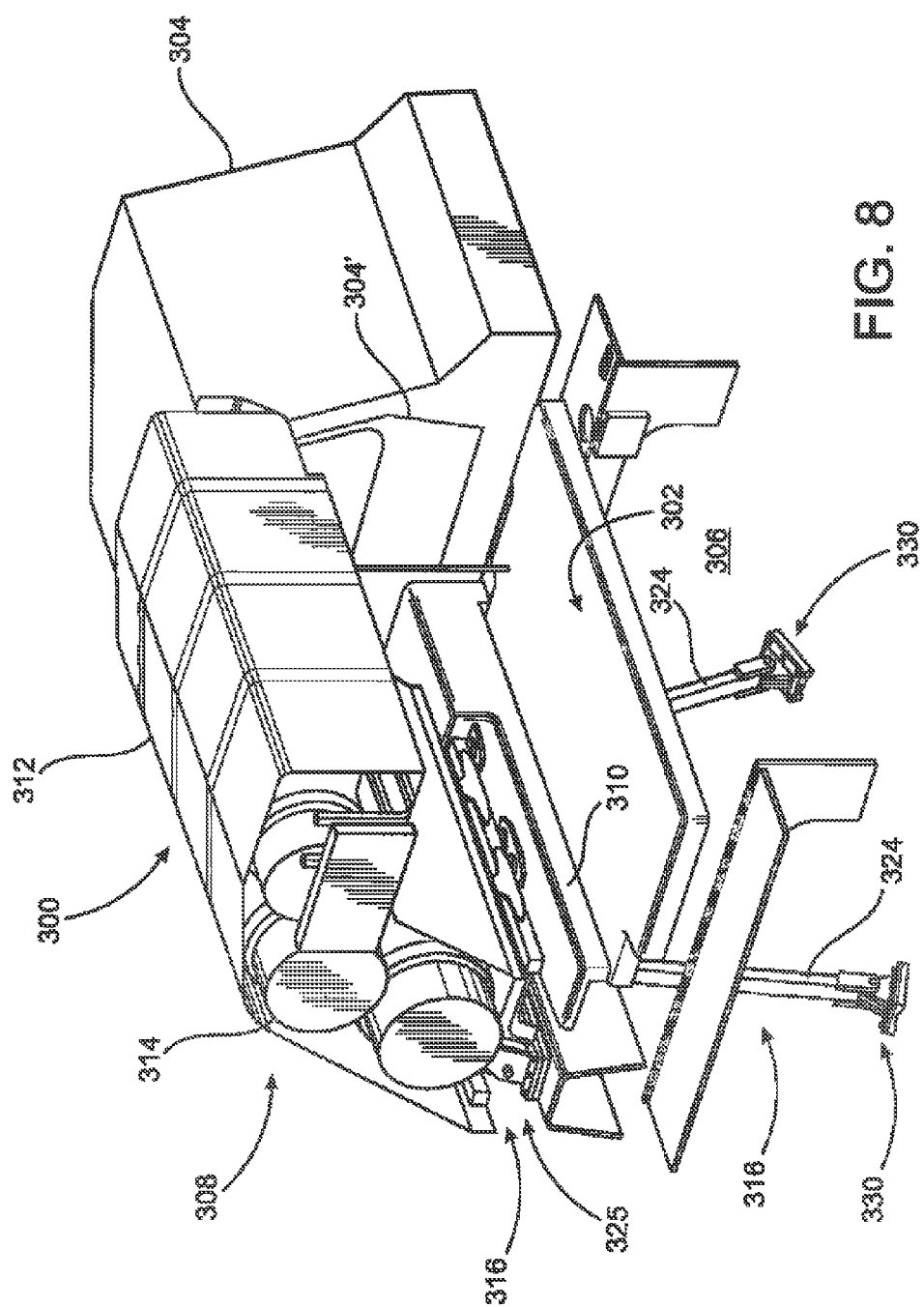
FIG. 8 is a perspective view of yet another preferred embodiment of a containment area and mounting assembly cooperatively dimensioned and configured to be disposed within at least one additional type of mine haul vehicle.
Figure 9:
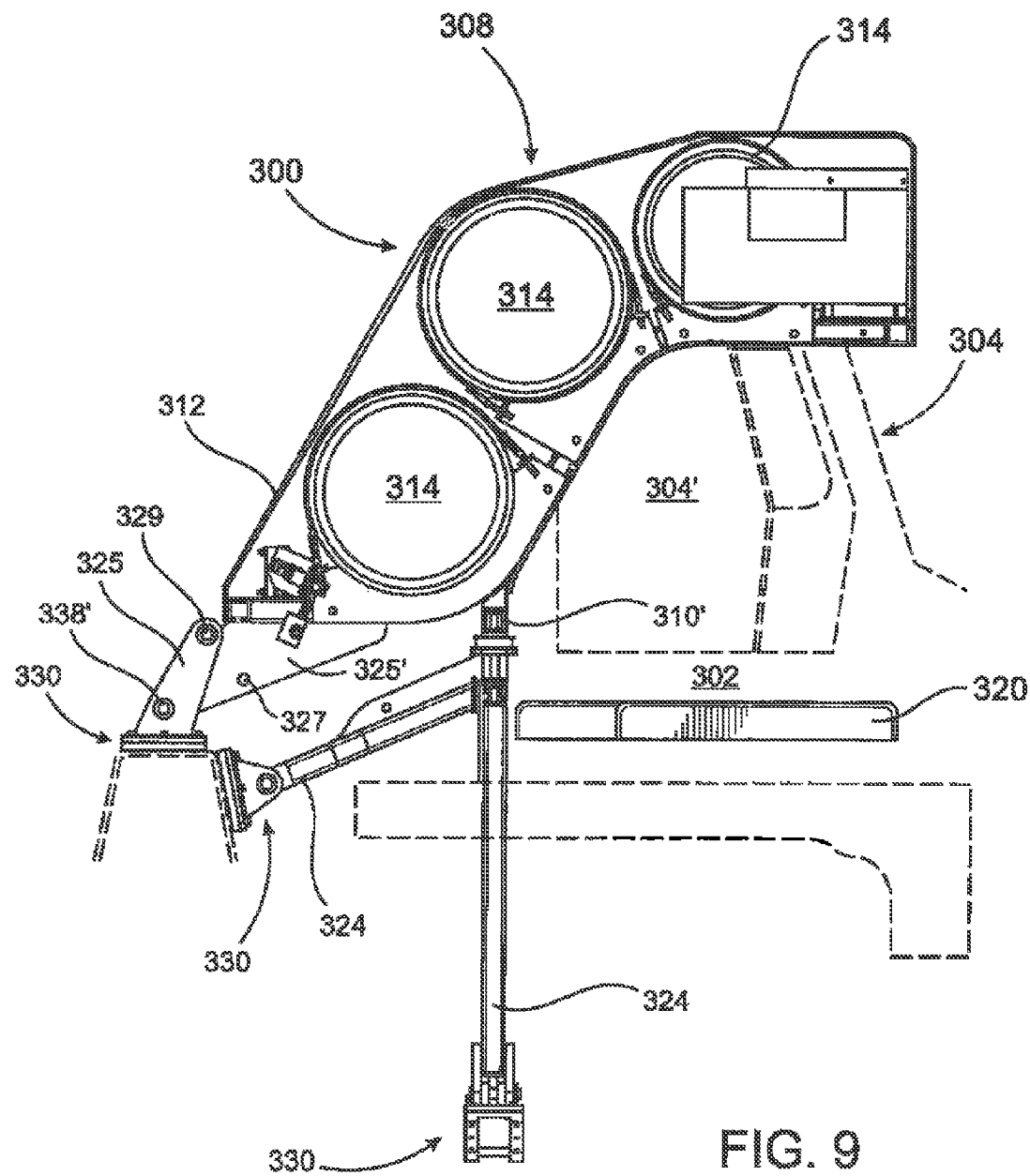
FIG. 9 is a side view in partial phantom of the embodiment of FIG. 8.
Figure 12:
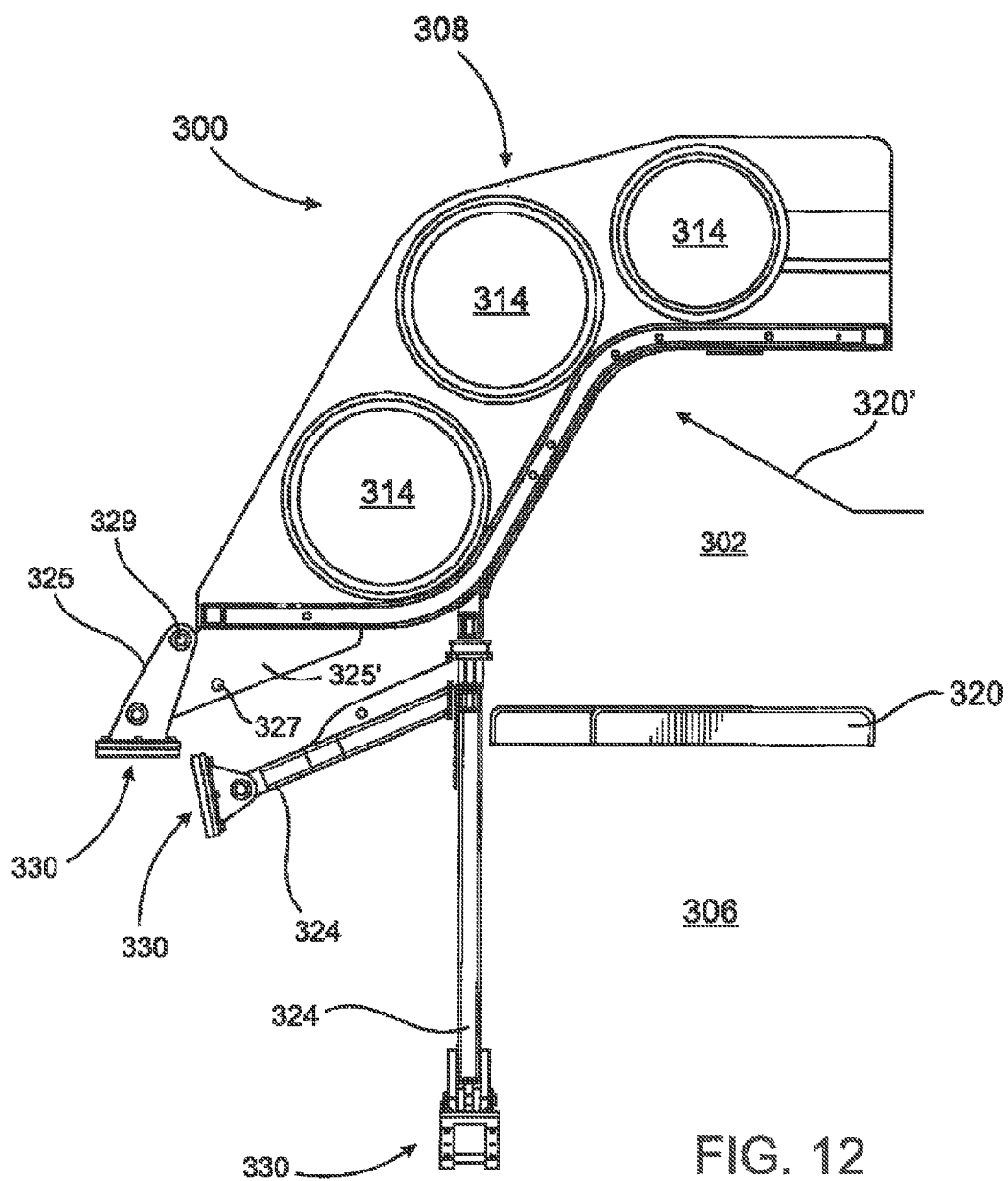
FIG. 12 is a side view in partial phantom of the preferred embodiment of FIGS. 8-11.
Figure 13:
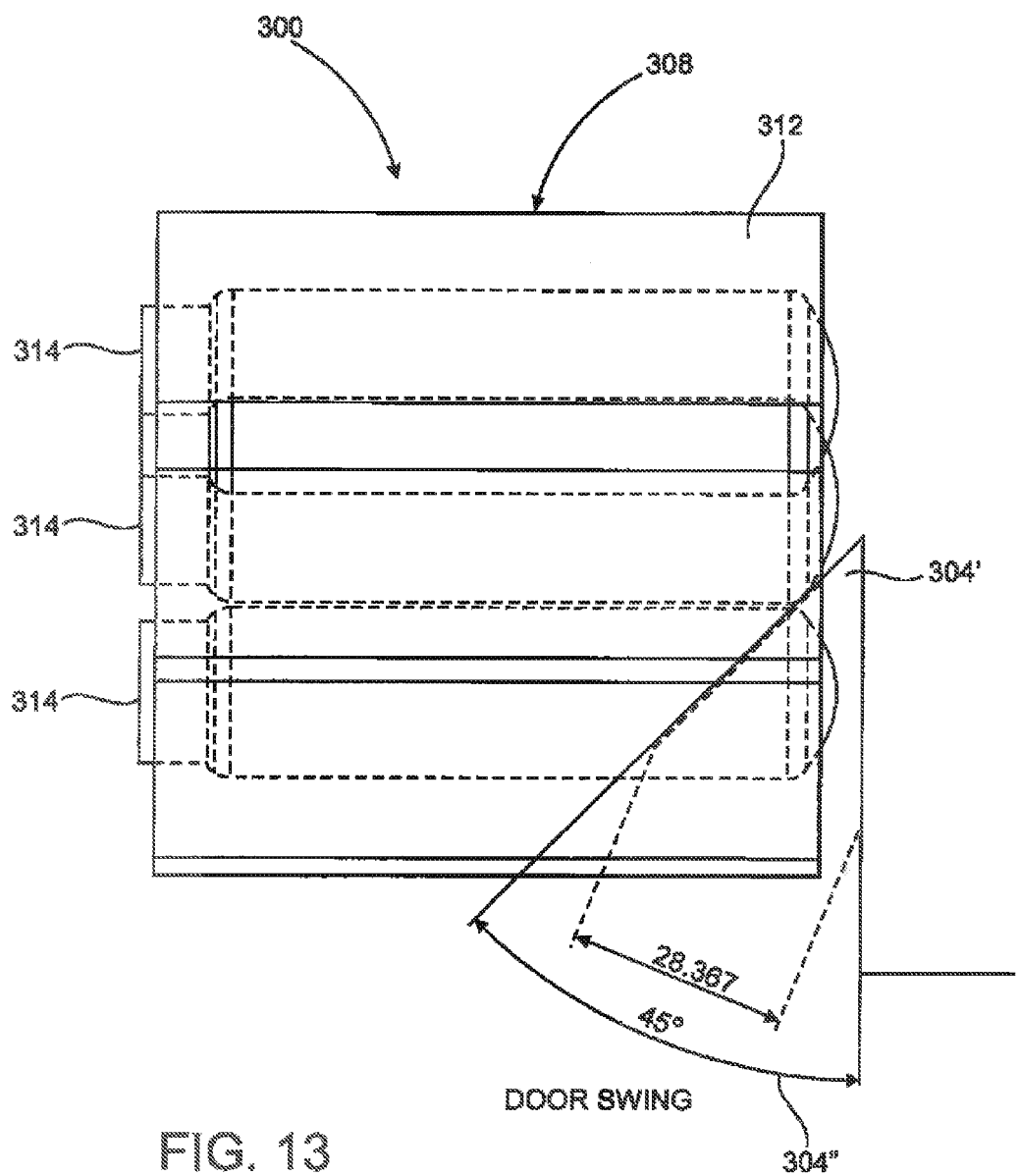
FIG. 13 is a top, schematic view and partial phantom of the embodiment of FIG. 8.

As will be explained in greater detail herein after, the dimension, configuration and disposition of the housing 308 is disposed immediately adjacent and possibly in at least partial interruptive relation to an entrance 304' of the operator cab 304. The housing 308 is also disposed in overlying at least partially covering relation to an access structure 320 overlying and at least partially enclosing a portion of the engine compartment 306. However, cooperative structuring of the mounting assembly 300, specifically including the housing 308, is such as to allow at least a minimal operative opening of the operator cab access 304' as well as operative opening of an access structure 320 as clearly represented in FIGS. 12 and 13 respectively. As will be explained in greater detail hereinafter, with specific but not exclusive reference to FIGS. 14 and 15, the housing 308 is selectively disposable between the first orientation as represented in FIGS. 8 through 15 and a second orientation as represented in FIG. 16. Moreover, the aforementioned conformance of the mounting assembly 300 as well as the containment area 302 to the particular mine haul vehicle 400 with which it is intended for use, allows the operative opening for both the operator cab entrance 304' and the access structure 320 while the housing 308 is in the first orientation. As schematically represented in FIG. 12, the operative opening of the operator cab entrance 304' may be defined by an opening thereof an at least 45 degree "door swing" from its closed position as represented in FIG. 8 to its operative opened position as represented in FIG. 13. Similarly, with reference to FIG. 13, the access structure 320 is disposed in overlying, at least partially covering relation to the engine compartment 306. Accordingly when access is required to the engine compartment 306, the access structure 320 is operatively opened as demonstrated by the opening path 320'.

Another feature of the present invention is the base 316 disposed in supporting relation to the housing 308, as well as defining an interconnection between the housing 308 and correspondingly disposed stable portions of the vehicle 400. More specifically, the base 316 includes a plurality of support members 324 and 325. The disposition, dimension and configuration of the plurality of support members 324 and 325 are such as to connect and support the housing 308 in the containment area 302 in a stable manner, while leaving a majority or at least a sufficient portion of the containment area 302 in an uncluttered state. The base 316 includes at least some or a first set 324 of the plurality of support members having an elongated configuration. Also, the support members 324 are removably connected or anchored at least partially within the engine compartment 306.

Figure 14:
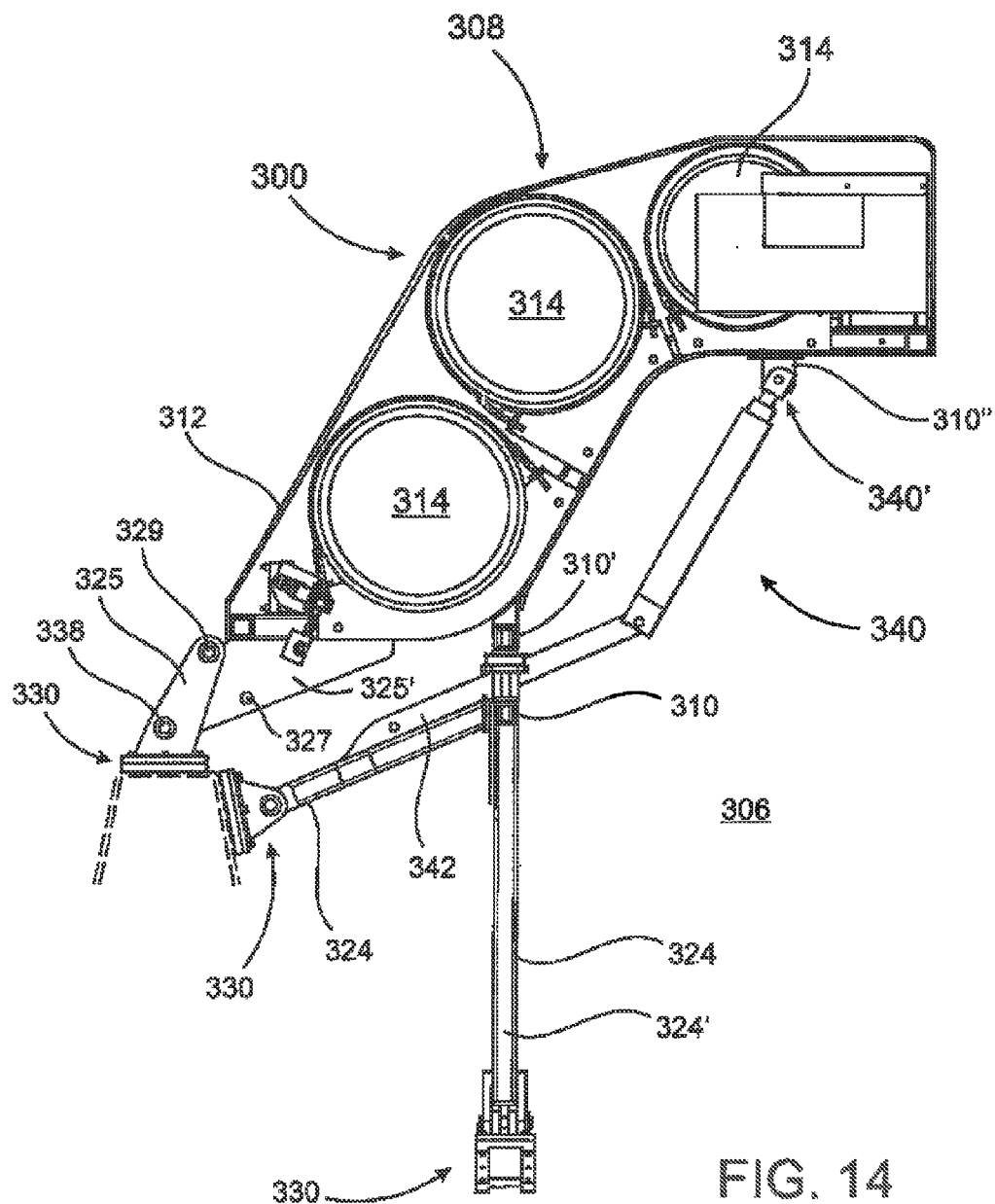
FIG. 14 is a side view of the embodiment of FIGS. 8-11 in a first orientation with a positioning assembly operatively secured thereto.
Figure 15:
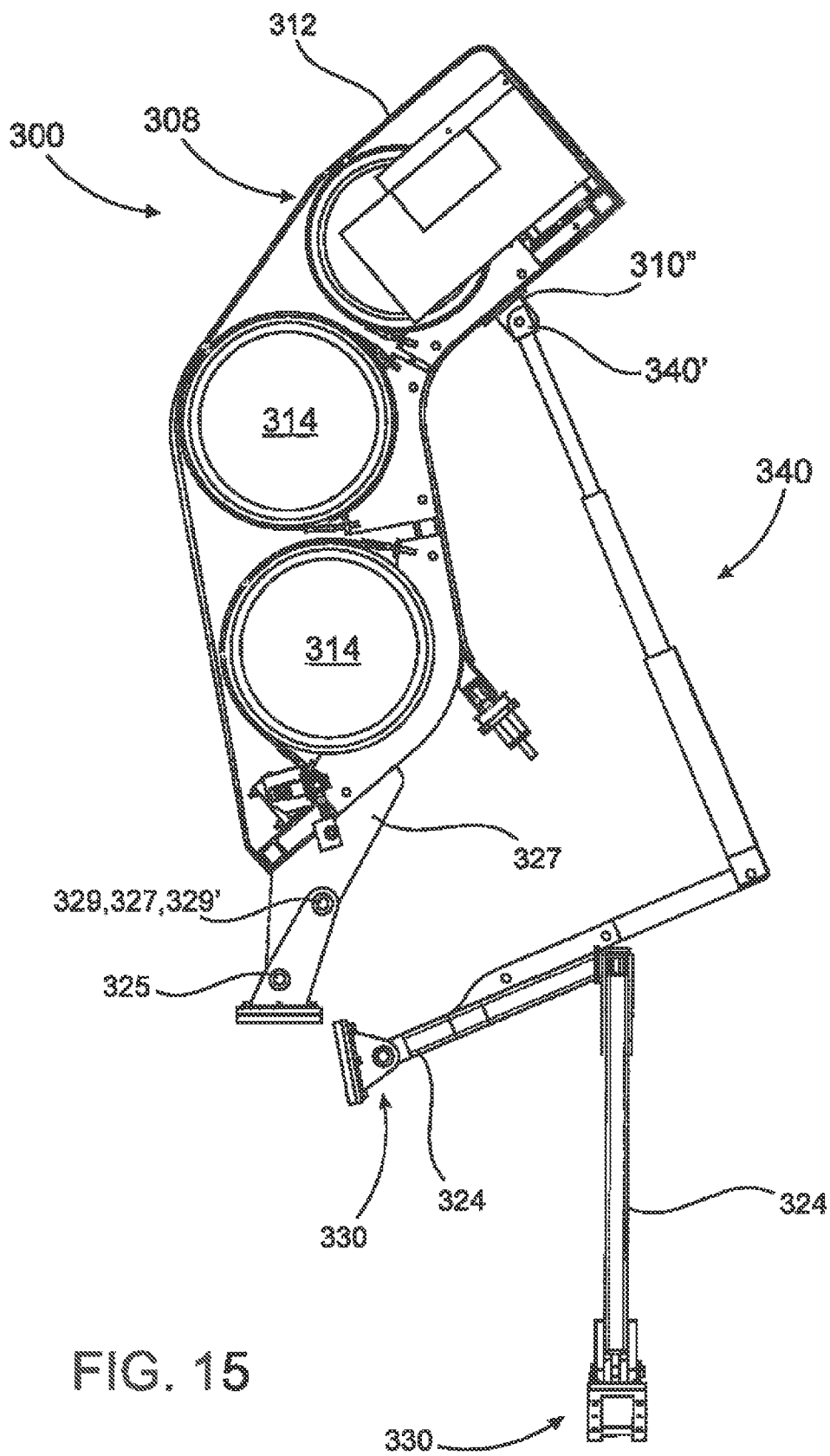
FIG. 15 is a side view of the embodiment of FIG. 14 in a second orientation with the positioning assembly operatively disposed in a different position from that of FIG. 14.
Figure 16:
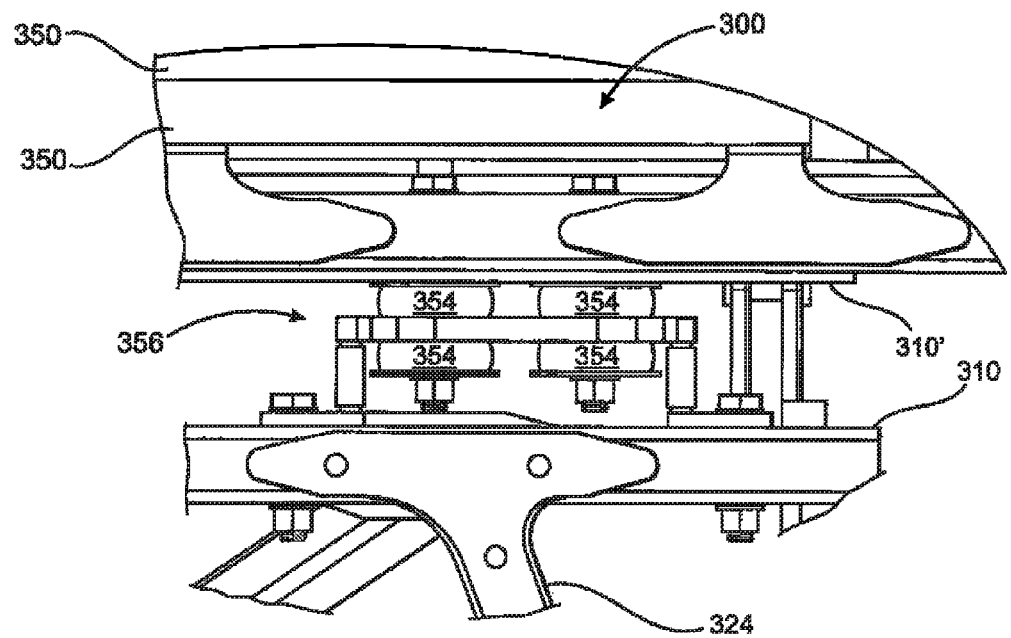
FIG. 16 is a front plan view in partial cutaway of interconnecting portions of a base and housing of the mounting assembly and a shock absorbing assembly associated therewith.

Similarly, the plurality of support members 325 are disposed and configured to maintain and support an interconnection of the housing 308, while further facilitating the positioning of the housing 308 between the aforementioned first orientation, as represented in FIGS. 8-14, and a second orientation as represented in FIG. 15. The plurality of support members 325 may include a shorter structure than support members 324 and also include a hinge assembly or structure, generally indicated as 325'. Further, a first set of the plurality of support members 324 as well as the second set or plurality of support members 325 are both securely anchored at least partially within the interior of the engine compartment 306 utilizing a plurality of mounts 330 represented in FIG. 11. Each of the plurality of mounts 330 have an anchor portion 332 welded or otherwise fixedly secured to an appropriately stable frame or brace portion on the interior of the engine compartment 306. A connecting platform or like structure 334 is bolted or otherwise fixedly secured to the anchor portion 332 and includes a one or more brackets 336 affixed thereto. Further, the brackets 336 are cooperatively disposed and structured to receive and support a pin member 338 which provides a stable interconnection but possibly at least some movement of the distal ends 324' to their corresponding mounts 330. The second set or plurality of support members 325 may have a somewhat different construction, such that one or more upstanding brackets or bracket pairs as at 336' include a different arrangement of a pin as at 338' which serves as a pivot point for the remainder of the hinge section or portion 325'. Also the hinge portion 325' includes a locking aperture or like structure 327 designed to be aligned with a through aperture or channel 329 for purposes of locking the hinge structure 325' in a position facilitating the support and interconnection of the housing 308 relative to the vehicle 400, when in the second orientation as demonstrated in FIG. 15.

As set forth above and with primary reference to FIGS. 14 and 15, the housing 308 of the mounting assembly 300 is selectively disposed between the first orientation as represented in FIGS. 14 and a second orientation as represented in FIG. 15. Accomplishing movement or repositioning of the housing 308 includes the use of a positioning assembly tool generally indicated in as 340. The positioning assembly tool 340 preferably comprises a fluid activated piston and cylinder assembly including a telescopic connection of the various components selectively disposable between a retracted position of FIG. 14 and an outwardly extended position of FIG. 15. Such activation of the positioning assembly or tool 340 is accomplished by connecting it to an appropriate fluid source such as, but not limited to, a fluid source of hydraulic or pneumatic fluid. When so connected and when appropriately activated, the positioning assembly tool 340 will be disposed between and into the retracted position of FIG. 14 or the extended position of FIG. 15.

Moreover, cooperative structuring of at least a portion of the frame 310 with the base and or a plurality of support members 324 further facilitates the disposition of the housing 308 between the first and second orientations. More specifically, the frame 310' is detachable from all or at least some of the plurality of support members 324, while remaining movably attached to the plurality of support members 325. In operation, the positioning assembly tool 340 is connected to a brace segment 342 fixedly or integrally secured to at least some of the plurality of support members 324. The outer or distal end 324, of the first set of support members 324 is connected to a corresponding portion of the frame 310". Accordingly, upon detachment of the frame portion 310" from corresponding ones of the support members 324 and a concurrent or subsequent activation of the positioning assembly tool 340, the housing 308 will be raised or otherwise disposed between the first orientation of FIG. 14 and the second orientation of FIG. 15. Once in the second orientation, the hinge structure 325 will remain connected to the frame 310 and effectively locked or fixed into the supporting orientation represented in FIG. 15 by an appropriate locking pin passing through apertures 327 and 327' as set forth above. Due to the fixed or locking position of the hinge member 325, the positioning assembly tool 340 may be removed from its interconnecting relation between the frame portions 310" and the brace segment 342 so as to provide clear access to the containment area 302, engine compartment 306, operator cab 304 and entrance 304' adjacent or other areas, as required.

Figure 16A:
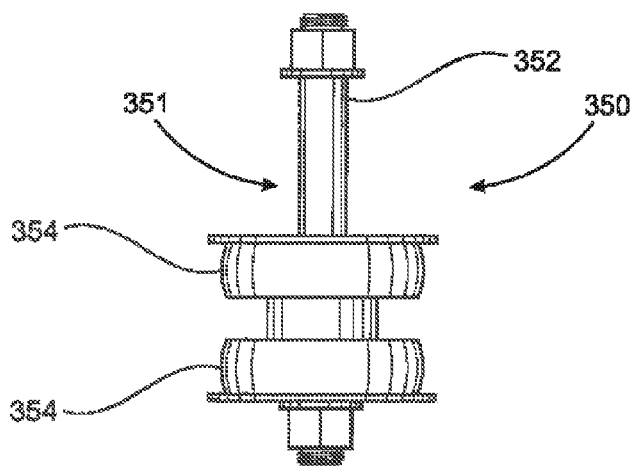
FIG. 16A is a detail view of an isolation mount associated with the embodiment of FIG. 16.

As should be apparent, during normal operation of the vehicle 400 whether idling or in an operative, traveling state, a certain amount of vibration will exist throughout the vehicle as well as the frame thereof. Accordingly, another structural and operative feature of the present invention is represented in FIGS. 16 and 16A and includes a shock absorber assembly generally indicated as 350. The shock absorber assembly 350 is preferably in the form of isolation mounts 351 including a connecting stem 352 and shock absorbing or vibration attenuating segments 354. Accordingly, the plurality of mounts 351 are appropriately interconnected between the frame 310 or the housing 308 and a connecting structure 356 associated with the frame or other corresponding portion of the base 316 to which at least some of the plurality of support members 324 are connected.

Further with regards to the mine haul vehicle 400, CATERPILLAR Model 793, one feature associated therewith is disposition and structuring of the mounting assembly 300 and its cooperative disposition and structure with the mine haul vehicle 400 to facilitate re-fueling of the alternate fuel supply, including the one or more tanks 314 from a ground level of the mine haul vehicle 400. Accordingly, a fuel supply 360 may be appropriately positioned on or adjacent the ground level of the mine haul vehicle 400 and include appropriate conduits or connecting hoses, etc. facilitating the transfer of the alternate fuel (LNG) from the fuel supply 360 to the one or more tanks 314.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for mounting an alternate fuel supply on a mine haul vehicle, said system comprising:
 a mounting assembly structured for containment and support of the alternate fuel supply,
 said mounting assembly comprising a housing disposed in retaining relation to at least one fuel tank for the alternate fuel supply,
 said mounting assembly further comprising a base disposed in interconnecting relation between said housing and the vehicle,
 said base movably supporting said housing; said housing disposable into and between a first orientation and a second orientation,
 a positioning assembly disposable in interconnecting relation between said base and said housing; said positioning assembly operative to dispose said housing between said first and second orientations,
 said base comprising a plurality of support members, said housing movably connected to and supported by at least some of said plurality of support members.

2. A system as recited in claim 1 wherein at least a portion of said base is removably connected to the mine haul vehicle; said housing detachable from said base.

3. A system as recited in claim 1 wherein said housing comprises a substantially angled configuration extending along its length between a lower end and an upper end portion thereof; said upper end portion extending transversely outward from a remainder of said housing.

4. A system as recited in claim 1 wherein said mounting assembly comprises a shock absorber assembly disposed in interconnecting relation between said housing and said base; said shock absorber assembly structured to restrict transmission of vibration to said housing from the mine haul vehicle.

5. A system as recited in claim 4 wherein said shock absorber assembly comprises a plurality of isolation mounts disposed between said base and said housing.

6. A system for mounting an alternate fuel supply on a mine haul vehicle, said system comprising:
 the mine haul vehicle comprising a CATERPILLAR 793 model,
 a mounting assembly structured for containment and support of the alternate fuel supply, a containment area located on the vehicle in laterally adjacent relation to an operator cab thereof; said mounting assembly disposed within said containment area, said mounting assembly comprising a housing disposed in retaining relation to at least one fuel tank for the alternate fuel supply, said mounting assembly further comprising a base disposed in interconnecting relation between said housing and said containment area, said containment area including an access structure disposed in covering relation to an engine compartment of the mine haul vehicle, a connecting assembly movably connecting said base to said housing; said base movably supporting said housing within said containment area in substantially adjacent relation to the operator cab and the engine compartment; said housing disposable within said containment area into and between a first orientation and a second orientation, said housing disposed in spaced, non-obstructing relation to an open orientation of said access structure and at least a partial opening of an entrance to the operator cab, said at least one fuel tank retained within said housing and disposed on said mounting assembly in said containment area in adjacent relation to the engine compartment of the mine haul vehicle, said base comprising a plurality of support members and a plurality of mounts; said plurality of mounts fixedly secured to the mine haul vehicle; and a first number of said plurality of said support members having a sufficient length to extend into a connecting relation with said housing, when said housing is in said first orientation.

7. The system as recited in claim 6 further comprising a positioning assembly comprising a fluid activated piston and cylinder assembly disposable in interconnecting relation between said base and said housing; said positioning assembly operative to dispose said housing between said first and said second orientations.

8. A system as recited in claim 6 comprising a second number of said plurality of support members movably connected in supporting relation to said housing when in a second orientation; said housing disposed in a detached relation to said first number of support members when in said second orientation.

9. A system as recited in claim 6 wherein said base is connected to the mine haul vehicle at least partially positioned within the engine compartment.

10. A system as recited in claim 6 wherein said housing is disposed and configured to facilitate an operative orientation of the entrance to the operator cab of at least 45 degrees when in said first orientation.

11. A system as recited in claim 6 wherein said housing is detachably connected to at least some others of said plurality of support members when in said second orientation.

* * * * *